United States Patent
Lu et al.

(10) Patent No.: US 11,297,588 B2
(45) Date of Patent: Apr. 5, 2022

(54) DEREGISTRATION METHOD, SESSION HANDLING METHOD, AND APPARATUS

(71) Applicant: HUAWEI TECHNOLOGIES CO., LTD., Guangdong (CN)

(72) Inventors: Wei Lu, Shanghai (CN); Huan Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 10 days.

(21) Appl. No.: 16/720,417

(22) Filed: Dec. 19, 2019

(65) Prior Publication Data
US 2020/0128505 A1  Apr. 23, 2020

Related U.S. Application Data

(63) Continuation of application No. PCT/CN2018/088683, filed on May 28, 2018.

(30) Foreign Application Priority Data

Jun. 20, 2017 (CN) .......................... 201710471231.4
Aug. 15, 2017 (CN) .......................... 201710698556.6
Feb. 14, 2018 (CN) .......................... 201810151950.2

(51) Int. Cl.
*H04W 4/00* (2018.01)
*H04W 60/06* (2009.01)
(Continued)

(52) U.S. Cl.
CPC ............. *H04W 60/06* (2013.01); *H04W 8/24* (2013.01); *H04W 68/02* (2013.01); *H04W 76/15* (2018.02); *H04W 88/06* (2013.01)

(58) Field of Classification Search
None
See application file for complete search history.

(56) References Cited

U.S. PATENT DOCUMENTS

2012/0282927 A1    11/2012  Park et al.
2013/0130736 A1*   5/2013   Kim ................. H04W 4/08
                                              455/519
(Continued)

FOREIGN PATENT DOCUMENTS

CN    101064946 A    10/2007
CN    101150852 A    3/2008
(Continued)

OTHER PUBLICATIONS

Huawei et al: "TS 23.501: Clarification of RM and CM for N3GPP access",3GPP Draft; S2-176263,Aug. 29, 2017 (Aug. 29, 2017), XP051335691,total 3 pages.
(Continued)

*Primary Examiner* — Suhail Khan
(74) *Attorney, Agent, or Firm* — Womble Bond Dickinson (US) LLP

(57) ABSTRACT

Embodiments of this disclosure provide a deregistration method, a session handling method, and an apparatus. The deregistration method includes: determining, by a terminal device, that the terminal device enters a deregistration state of a first access network; and setting, by the terminal device, a status of the terminal device to deregistered from the first access network. According to the method, the terminal device is deregistered from the first access network.

17 Claims, 9 Drawing Sheets

(51) Int. Cl.
*H04W 76/15* (2018.01)
*H04W 8/24* (2009.01)
*H04W 68/02* (2009.01)
*H04W 88/06* (2009.01)

(56) References Cited

U.S. PATENT DOCUMENTS

2018/0324577 A1* 11/2018 Faccin .................. H04W 48/18
2020/0137675 A1* 4/2020 Park ...................... H04W 60/00

FOREIGN PATENT DOCUMENTS

| CN | 101166134 A | 4/2008 |
| CN | 101568178 A | 10/2009 |
| WO | 2013085127 A1 | 6/2013 |

OTHER PUBLICATIONS

Nokia et al: "23.501: Idle and de-registered states in untrusted non-3GPP access",3GPP Draft;S2-173176,May 14, 2017 (May 14, 2017), XP051281679,total 6 pages.
Motorola Mobility et al: "Release of NWu connection",3GPP Draft;S2-173750,May 20, 2017 (May 20, 2017), XP051289254,total 4 pages.
ETRI: "23.502: PDU session mobility procedure between N3GPP access and 5G-RAN",3GPP Draft; S2-171069,Feb. 7, 2017 (Feb. 7, 2017), XP051228330,total 8 pages.

* cited by examiner

DEREGISTRATION METHOD, SESSION HANDLING METHOD, AND APPARATUS

CROSS-REFERENCE TO RELATED APPLICATION

This application is a continuation of International Application No. PCT/CN2018/088683, filed on May 28, 2018, which claims priority to Chinese Patent Application No. 201810151950.2, filed on Feb. 14, 2018, which claims priority to Chinese Patent Application No. 201710698556.6, filed on Aug. 15, 2017, which claims priority to Chinese Patent Application No. 201710471231.4, filed on Jun. 20, 2017. The disclosure of the aforementioned applications are hereby incorporated by reference in their entireties.

TECHNICAL FIELD

This disclosure relates to the field of mobile communications technologies, and in particular, to a deregistration method, a session handling method, and an apparatus.

BACKGROUND

In the conventional art, a core network allows access of a terminal device from a 3rd generation partnership project (3GPP) access network, and also allows access of the terminal device from a non-3GPP (N3GPP) access network through an access gateway (for example, a non-3GPP inter-working function (N3IWF) network element).

However, currently, there is still no corresponding solution for how to deregister a terminal from the N3GPP access network or the 3GPP access network.

SUMMARY

Embodiments of this disclosure provide a deregistration method, a session handling method, and an apparatus, to deregister a terminal device from a first access network.

To achieve the foregoing objective, this disclosure provides the following technical solutions:

According to a first aspect, a deregistration method is provided, and includes: determining, by a first core network element, that a terminal device enters a deregistration state of a first access network; and setting, by the first core network element, status information of the terminal device to deregistered from the first access network. According to the method, the terminal device is deregistered from the first access network, and the method is simple and easy to implement, thereby improving system efficiency.

In one embodiment, the first core network element may be a network element that has an access and mobility management function, for example, an access and mobility management function (AMF) network element.

In one embodiment, the first core network element sends first instruction information to a second core network element, where the first instruction information is used to instruct the second core network element to determine an access type of a first packet data unit (PDU) session as access from a second access network; and/or the first instruction information is used to instruct the second core network element to release a connection that is on the first access network and that corresponds to the first PDU session, and the first PDU session is a PDU session that is set up by the terminal device on the first access network and accessible on the second access network. In this way, PDU session related information can be further modified on a network side, including determining the access type of the first PDU session and/or releasing the connection on the first access network.

According to a second aspect, a deregistration method is provided, and includes: determining, by a first core network element, that a terminal device enters a deregistration state of a first access network, and sending, by the first core network element, first instruction information to a second core network element, where the first instruction information is used to instruct the second core network element to determine an access type of a first packet data unit PDU session as access from a second access network; and/or the first instruction information is used to instruct the second core network element to release a connection that is on the first access network and that corresponds to the first PDU session, and the first PDU session is a PDU session that is set up by the terminal device on the first access network and accessible on the second access network. According to the method, the terminal device is deregistered from the first access network, and the method is simple and easy to implement, thereby improving system efficiency.

In one embodiment, the first aspect or the second aspect further includes the following implementations.

In one embodiment, the first core network element receives a first message sent by the terminal device on the second access network, and the first core network element sends a second message to the second core network element based on the first message, where the second message is used by the second core network element to determine a PDU session that is set up by the terminal device on the first access network and accessible on the second access network. In this way, the second core network element may be triggered based on the first message sent by the terminal device, to determine the PDU session that is set up by the terminal device on the first access network and accessible on the second access network.

In one embodiment, the second message includes the first instruction information. In this way, an operation that needs to be performed by the second core network element may be indicated by using a message, thereby reducing signaling overheads.

In one embodiment, the PDU session that is set up by the terminal device on the first access network and accessible on the second access network and that is determined by the second core network element is the first PDU session.

In one embodiment, the first message and the second message include information about a second PDU session, and the second PDU session is a PDU session that is set up by the terminal device on the first access network and accessible on the second access network and that is determined by the terminal device.

In one embodiment, the PDU session that is set up by the terminal device on the first access network and accessible on the second access network and that is determined by the second core network element is determined by the second core network element based on the information about the second PDU session.

The foregoing provides two methods for determining a PDU session that is set up by the terminal device on the first access network and accessible on the second access network. In the first method, the terminal device does not need to send information about the PDU session of the terminal device, and in the second method, the terminal device needs to send information about the PDU session of the terminal device. A corresponding method may be selected and performed based on an actual requirement.

In one embodiment, the first core network element receives information about a third PDU session from the second core network element, where the third PDU session is a PDU session that is set up by the terminal device on the first access network and accessible on the second access network and that is determined by the second core network element; and the first core network element sends the information about the third PDU session to the terminal device. In this way, the first core network element may send the third PDU session to the terminal device, so that a core network side and a terminal side can maintain PDU session synchronization by using the third PDU session, thereby improving PDU session accuracy.

In one embodiment, the first core network element sends second instruction information to the terminal device, where the second instruction information is used to instruct the terminal device to determine a PDU session accessible on the second access network. In this way, the terminal device may be explicitly notified that the core network side has deregistered the terminal device from the first core network.

In one embodiment, the information about the second PDU session and/or the information about the third PDU session includes a context of the PDU session and/or an access type corresponding to the PDU session, and the context of the PDU session includes at least the access type corresponding to the PDU session.

In one embodiment, status information of the terminal device is status information in the context of the PDU session.

According to a third aspect, an embodiment of this disclosure provides a deregistration apparatus. The apparatus has a function of implementing the first core network element in the first aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the first aspect.

According to a fourth aspect, an embodiment of this disclosure provides a deregistration apparatus. The apparatus has a function of implementing the first core network element in the second aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the second aspect.

According to a fifth aspect, a deregistration method is provided, and includes: determining, by a terminal device, that the terminal device enters a deregistration state of a first access network; and setting, by the terminal device, a status of the terminal device to deregistered from the first access network.

In one embodiment, if the terminal device is in an idle mode for a time period longer than a predetermined duration or a specified duration, the terminal device determines that the terminal device enters the deregistration state of the first access network; or if the terminal device receives second instruction information from a first core network element, the terminal device determines, according to the second instruction information, that the terminal device enters the deregistration state of the first access network.

In one embodiment, the terminal device receives information about a third PDU session from a second core network element, where the third PDU session is a PDU session that is set up by the terminal device on the first access network and accessible on a second access network and that is determined by the second core network element; and the terminal device determines, based on the information about the third PDU session, a PDU session accessible on the second access network.

In one embodiment, the terminal device sends information about a second PDU session to the second core network element on the second access network by using the first core network element, where the second PDU session is a PDU session that is set up by the terminal device on the first access network and accessible on the second access network and that is determined by the terminal device, and the third PDU session is determined by the second core network element based on the information about the second PDU session.

In one embodiment, the terminal device determines an access type of a PDU session that is set up by the terminal device on the first access network and accessible on the second access network as access from the second access network.

In one embodiment, the information about the second PDU session and/or the information about the third PDU session includes a context of the PDU session and/or an access type corresponding to the PDU session.

In one embodiment, status information of the terminal device is status information in the context of the PDU session.

According to a sixth aspect, an embodiment of this disclosure provides a deregistration apparatus. The apparatus has a function of implementing the terminal device in the foregoing fifth aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the fifth aspect.

According to a seventh aspect, a deregistration method is provided, and includes: receiving, by a second core network element, first instruction information from a first core network element; and determining, by the second core network element according to the first instruction information, an access type of a first packet data unit PDU session as access from a second access network, and/or releasing a connection that is on a first access network and that corresponds to the first PDU session, where the first PDU session is a PDU session that is set up by a terminal device on the first access network and accessible on the second access network.

In one embodiment, the second core network element sends information about a third PDU session to the terminal device, where the third PDU session is a PDU session that is set up by the terminal device on the first access network and accessible on the second access network and that is determined by the second core network element.

In one embodiment, the second core network element receives information about a second PDU session from the terminal device, where the second PDU session is a PDU session that is set up by the terminal device on the first access network and accessible on the second access network and that is determined by the terminal device; and the second core network element determines the information about the third PDU session based on the information about the second PDU session.

In one embodiment, the first PDU session is the second PDU session or the third PDU session.

According to an eighth aspect, an embodiment of this disclosure provides a deregistration apparatus. The apparatus has a function of implementing the second core network element in the foregoing seventh aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the seventh aspect.

According to a ninth aspect, a packet data unit PDU session handling method is provided, and includes:

receiving, by a second core network element, information about a second PDU session from a terminal device, where the second PDU session is a PDU session that is set up by the terminal device on a first access network and accessible on a second access network and that is determined by the terminal device; and determining, by the second core network element, information about a third PDU session based on the information about the second PDU session, where the third PDU session is a PDU session that is set up by the terminal device on the first access network and accessible on the second access network and that is determined by the second core network element; and sending, by the second core network element, the information about the third PDU session to the terminal device. According to the method, PDU session synchronization between a terminal side and a network side can be implemented.

According to a tenth aspect, an embodiment of this disclosure provides a deregistration apparatus. The apparatus has a function of implementing the second core network element in the foregoing ninth aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the ninth aspect.

According to an eleventh aspect, a deregistration processing method is provided, and includes:

determining, by a terminal device, that the terminal device is in an idle mode for a time period longer than a specified duration;

initiating, by the terminal device, setup of a packet data unit PDU session on a second access network, where the PDU session is a PDU session that is set up on a first access network and accessible on the second access network; and determining, by the terminal device, that the terminal device enters a deregistration state of the first access network.

In one embodiment, the terminal device determines the PDU session that is set up on the first access network and accessible on the second access network.

In one embodiment, the terminal device receives information about a third PDU session from a second core network element, where the third PDU session is a PDU session that is set up by the terminal device on the first access network and accessible on the second access network and that is determined by the second core network element; and the determining, by the terminal device, the PDU session that is set up on the first access network and accessible on the second access network includes:

determining, by the terminal device based on the information about the third PDU session, the PDU session that is set up by the terminal device on the first access network and accessible on the second access network.

In one embodiment, the terminal device sends information about a second PDU session to the second core network element on the second access network, where the second PDU session is a PDU session that is set up by the terminal device on the first access network and accessible on the second access network and that is determined by the terminal device, and the third PDU session is determined by the second core network element based on the information about the second PDU session.

In one embodiment, the method further includes: determining, by the terminal device, an access type of a PDU session that is set up by the terminal device on the first access network and accessible on the second access network as access from the second access network.

In one embodiment, the method further includes:

setting, by the terminal device, a status of the terminal device to deregistered from the first access network.

According to a twelfth aspect, an embodiment of this disclosure provides a deregistration apparatus. The apparatus has a function of implementing the terminal device in the foregoing eleventh aspect. The function may be implemented by hardware, or may be implemented by hardware executing corresponding software. The hardware or the software includes one or more modules corresponding to the function.

In one embodiment, the apparatus includes a processor, a transceiver, and a memory. The memory is configured to store a computer executable instruction. The transceiver is configured to implement communication between the apparatus and another communications entity. The processor is connected to the memory by using the bus, and when the apparatus is run, the processor executes the computer executable instruction stored in the memory, enabling the deregistration apparatus to perform the method according to the eleventh aspect.

According to a thirteenth aspect, an embodiment of this disclosure provides a session handling method, including: determining, by a terminal device, that the terminal device enters an idle mode of a first access network or determining, by the terminal device, that the terminal device is in the idle mode of the first access network for a time period longer than a specified duration; and sending, by the terminal device, a request message on a second access network, where the request message includes information about a to-be-activated PDU session, and the information about the to-be-activated PDU session includes information about a PDU session set up by the terminal device on the first access network.

In one embodiment, the request message includes a service request message.

In one embodiment, the method further includes: determining, by the terminal device, an access technology for a PDU session that is set up by the terminal device on the first access network and that is to be activated on the second access network as a technology of the second access network.

According to a fourteenth aspect, an embodiment of this disclosure provides a session handling apparatus, including: a processing unit, configured to determine that the session handling apparatus enters an idle mode of a first access network or is in the idle mode of the first access network for a time period longer than a specified duration; and a transceiver unit, configured to send a request message on a second access network, where the request message includes information about a to-be-activated PDU session, and the information about the to-be-activated PDU session includes information about a PDU session set up by the session handling apparatus on the first access network.

In one embodiment, the request message includes a service request message.

In one embodiment, the processing unit is further configured to determine an access technology for a PDU session that is set up by the session handling apparatus on the first access network and that is to be activated on the second access network as a technology of the second access network.

In any one of the first to the thirteenth aspects, the PDU session that is set up by the terminal device on the first access network and accessible on the second access network includes a session that is set up by the terminal device on the first access network and that is to be activated on the second access network.

In any one of the first to the thirteenth aspects, the information about the second PDU session includes a session that is set up by the terminal device on the first access network and to be activated on the second access network and that is determined by the terminal device.

In any one of the first to the thirteenth aspects, the second core network element determines a to-be-activated session based on the session that is set up by the terminal device on the first access network and that is to be activated on the second access network.

According to a fifteenth aspect, an embodiment of this disclosure provides a computer storage medium, storing a computer software instruction used by a first core network element, where the computer software instruction includes a program designed for the first core network element to perform the foregoing aspects.

According to a sixteenth aspect, an embodiment of this disclosure provides a computer storage medium, storing a computer software instruction used by a session management network element, where the computer software instruction includes a program designed for a second core network element to perform the foregoing aspects.

According to a seventeenth aspect, an embodiment of this disclosure provides a computer storage medium, storing a computer software instruction used by a terminal, where the computer software instruction includes a program designed for a terminal device to perform the foregoing aspects.

According to an eighteenth aspect, an embodiment of this disclosure provides a computer program product. The computer program product includes a computer software instruction, and the computer software instruction may be loaded by a processor to implement operations in the methods in the first aspect, the second aspect, the fifth aspect, the seventh aspect, the ninth aspect, the eleventh aspect, and the thirteenth aspect.

According to a nineteenth aspect, an embodiment of this disclosure provides a chip. The chip includes a processor and a transceiver component, and optionally further includes a memory, to perform the deregistration methods according to the foregoing aspects.

According to a twentieth aspect, an embodiment of this disclosure provides a chip. The chip includes a processor and a transceiver component, and optionally further includes a memory, to perform the session handling methods according to the foregoing aspects.

In addition, for a technical effect brought by any design of the second aspect to the twentieth aspect, refer to technical effects brought by different designs of the first aspect. Details are not described herein again.

These aspects or other aspects in this disclosure may be clearer and easier to understand in descriptions in the following embodiments.

DESCRIPTION OF EMBODIMENTS

The following describes the technical solutions in the embodiments of this disclosure with reference to the accompanying drawings in the embodiments of this disclosure. A specific operation method in a method embodiment may also be applied to an apparatus embodiment or a system embodiment. In the descriptions of this disclosure, unless otherwise stated, "a plurality" means two or more than two.

Figure 1:
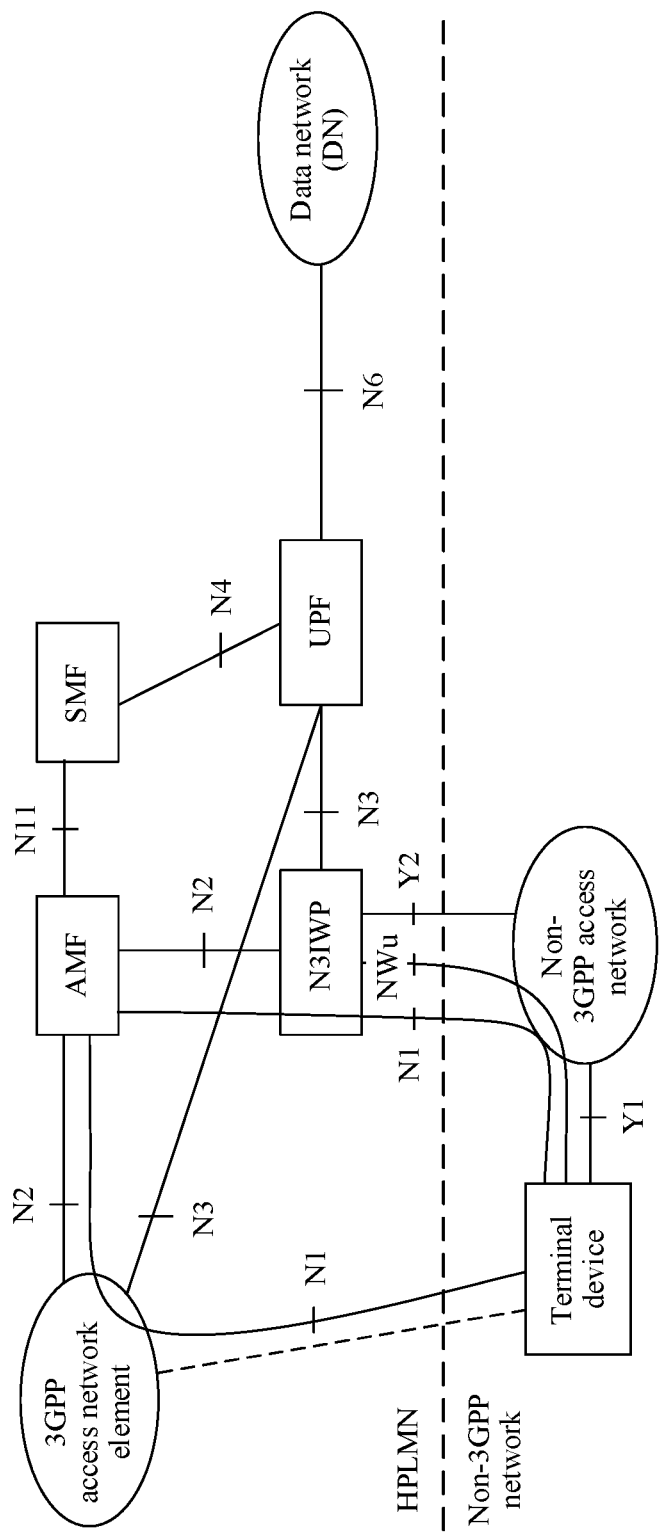
FIG. 1 is a schematic diagram of a network architecture according to an embodiment of this disclosure.

FIG. 1 is a schematic diagram of a network architecture according to an embodiment of this disclosure. The network architecture includes a 3GPP access network element, a non-3GPP (N3GPP) access network, a non-3GPP network access gateway (for example, an N3IWF network element), an access and mobility management function (AMF) network element, a session management function (SMF) network element, a user plane function (UPF) network element, a data network (DN) network element, and the like.

A terminal device may be connected to a core network device by using a 3GPP access network and/or a N3GPP access network. The 3GPP access network element includes, for example, a gNodeB in 5G. The N3GPP access network is an access network different from 3GPP access network, for example, a wireless local area network (WLAN). The N3IWF network element is similar to an evolved packet data gateway (ePDG) in long term evolution (LTE), and is configured to establish an internet protocol security (IPsec) tunnel with user equipment (UE) in 5G when the UE accesses a network by using the N3GPP access network. In a definition of a 5G, the N3IWF may be named differently. In this disclosure, that a non-3GPP network access gateway is the N3IWF is merely used as an example for description.

The terminal device is a device that has a wireless transmission/reception function, and the terminal device may be deployed on land, including an indoor device, an outdoor device, a handheld device, or a vehicle-mounted device, or may be deployed on the water (for example, on a ship), or may be deployed in the air (for example, on a plane, a balloon, or a satellite). The terminal may be a mobile phone, a tablet computer (pad), a computer with a wireless transmission/reception function, a virtual reality (VR) terminal, an augmented reality (AR) terminal, a wireless terminal in industrial control a wireless terminal in self driving, a wireless terminal in a remote medical treatment, a wireless terminal in a smart grid, a wireless terminal in transportation safety, a wireless terminal in a smart city, a wireless terminal in a smart home, or the like.

The AMF network element is responsible for access management and mobility management of a terminal. In an actual disclosure, the AMF network element includes a mobility management function of a mobility management entity (MME) in a network framework in LTE, and further includes an access management function.

The SMF network element is responsible for session management, for example, setup of a session of a user, and may include a session management function of a mobility management network element MME, or include control plane functions of a serving gateway (SGW) and a public data network (PDN) gateway (PDN-GW) in LTE. The data network DN network element is a network responsible for providing a service for UE. The DN may include a plurality of different application servers, to provide different application services for the UE.

In this embodiment of this disclosure, a first access network is one of a 3GPP access network and a N3GPP access network, and a second access network is the other of the 3GPP access network and the N3GPP access network. For ease of description, in this embodiment of this disclosure, an example in which the first access network is a N3GPP access network, and the second access network is a 3GPP access network is used for description. In this embodiment of this disclosure, a first core network element may be a network element having an access and mobility management function, for example, may be the AMF network element in FIG. 1. The second core network element may be a network element having a session management function, for example, may be the SMF network element in the architecture shown in FIG. 1.

Figure 2:
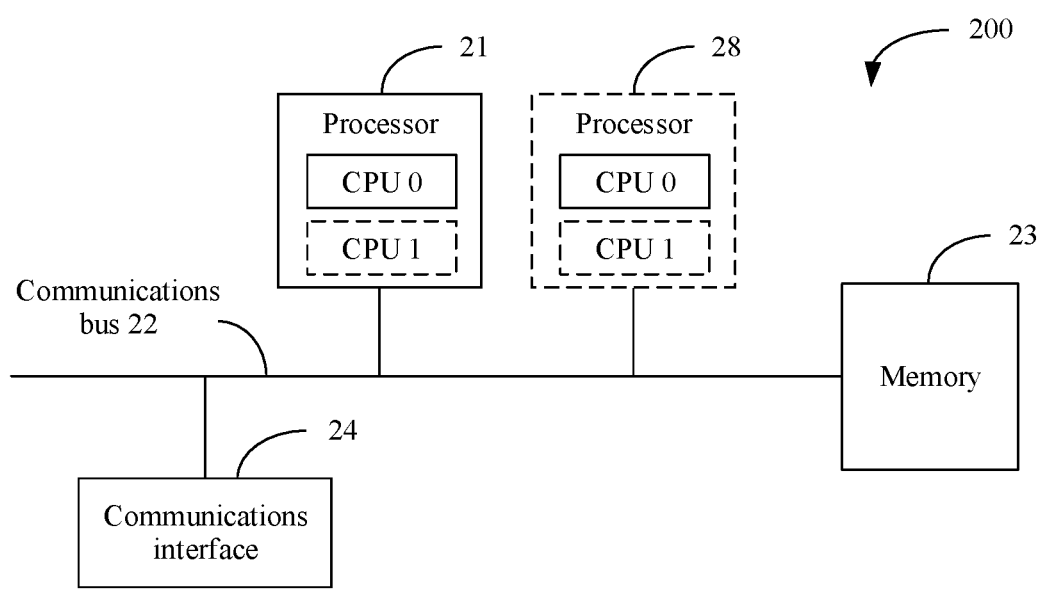
FIG. 2 shows a deregistration apparatus according to an embodiment of this disclosure.

FIG. 2 shows a deregistration apparatus 200 according to an embodiment of this disclosure. The apparatus 200 includes at least one processor 21, a communications bus 22, a memory 23, and at least one communications interface 24. The apparatus 200 may be the first core network element in the embodiments of this disclosure, for example, may be the AMF network element in FIG. 1. Alternatively, the apparatus 200 may be the terminal (or the UE) in the embodiments of this disclosure. The apparatus 200 may be configured to perform a deregistration method provided in the embodiments of this disclosure.

The processor 21 may be a general-purpose central processing unit (CPU), a microprocessor, an application-specific integrated circuit (ASIC), or one or more integrated circuits configured to control execution of a program in the solutions of this disclosure.

The communications bus 22 may include a channel and transfer information between the foregoing components. The communications interface 24 is any apparatus such as a transceiver, and is configured to communicate with another device or a communications network, where the communications network may be the Ethernet, a radio access network (RAN), a WLAN, or the like. When the apparatus 200 is a terminal device, the communications interface 24 may be a transceiver.

The memory 23 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, optical disc storage (including a compressed optical disc, a laser disc, an optical disc, a digital versatile optical disc, a Blu-ray disc, or the like), or magnetic disk storage medium or another magnetic storage device, or any other medium that can be used to carry or store expected program code in a form of an instruction or a data structure and accessible by the apparatus. This disclosure is not limited thereto. The memory may exist independently, and is connected to the processor by using the bus. The memory may be alternatively integrated with the processor.

The memory 23 is configured to store application program code used to execute the solutions of this disclosure, where the application program code is executed under control of the processor 21. The processor 21 is configured to execute the application program code stored in the memory 23.

During specific implementation, in an embodiment, the processor 21 may include one or more CPUs, for example, a CPU 0 and a CPU 1 in FIG. 2.

During specific implementation, in an embodiment, the apparatus 200 may include a plurality of processors, for example, the processor 21 and a processor 28 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

For example, the AMF network element in FIG. 1 may be the apparatus shown in FIG. 2, and a memory of the AMF network element stores one or more software modules. The AMF network element may implement the software modules by using a processor and program code in the memory, to implement a deregistration method of the AMF network element in the embodiments of this disclosure.

For example, the terminal device in FIG. 1 may be the apparatus shown in FIG. 2, and a memory of the terminal device stores one or more software modules. The terminal device may implement the software modules by using a processor and program code in the memory, to implement a deregistration method of the terminal device in the embodiments of this disclosure.

For example, the SMF network element in FIG. 1 may be the apparatus shown in FIG. 2, and a memory of the SMF network element stores one or more software modules. The SMF network element may implement the software modules by using a processor and program code in the memory, to implement a deregistration method of the SMF network element in the embodiments of this disclosure.

Figure 3:
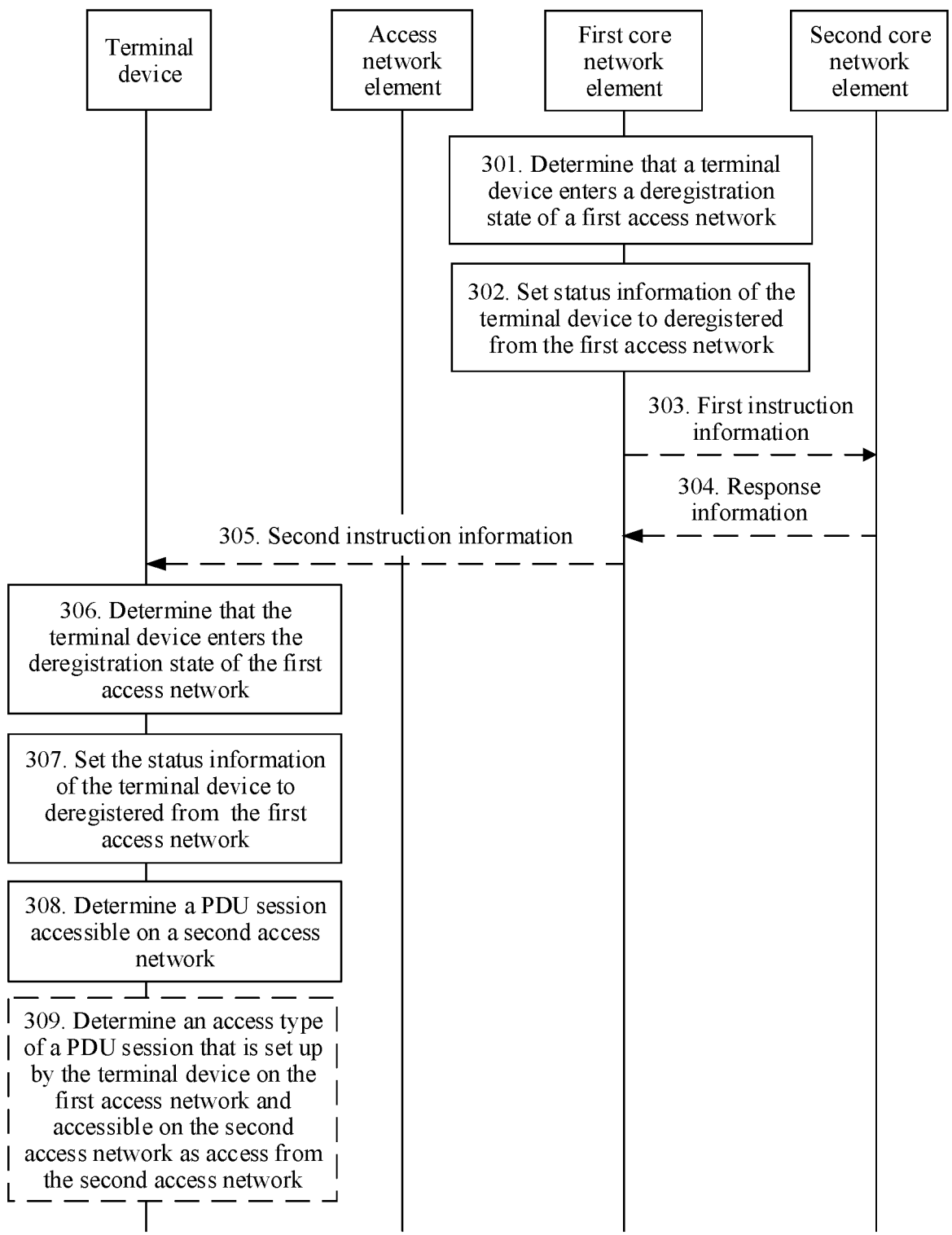
FIG. 3 is a schematic diagram of a deregistration method according to an embodiment of this disclosure.

FIG. 3 shows a deregistration method according to an embodiment of this disclosure. The method may be performed by a first core network element. In a possible implementation, the first core network element may be a network element having an access and mobility management function, for example, may be the AMF network element in FIG. 1. In one embodiment, the first core network element has a structure shown in FIG. 2. In this embodiment, operation numbers are merely for convenience of description, and there is no strict execution sequence relationship between operations. The method includes the following operations.

Operation 301. The first core network element determines that a terminal device enters a deregistration state of a first access network.

For example, the first core network element may determine, in the following cases, that the terminal device enters the deregistration state of the first access network:

After the first core network element releases a control plane connection (for example, an N2 connection between the AMF network element and an N3IWF network element) to the first access network, if a timer (for example, a non-3GPP implicit detach timer) expires, the first core network element determines that the terminal device enters the deregistration state of the first access network. Alternatively, after initiating a process of explicitly deregistering the terminal device, the first core network element determines that the terminal device enters the deregistration state of the first access network.

Operation 302. The first core network element sets status information of the terminal device to deregistered from the first access network.

The status information of the terminal device may be status information in a context of a PDU session, or may be a status parameter. For example, the status parameter is set to corresponding values, to indicate that the terminal is in different states. One of the states is that the terminal device is deregistered from the first access network.

In this embodiment, when determining that the terminal device enters the deregistration state of the first access network, the first core network element sets the status information of the terminal device to deregistered from the first access network, thereby deregistering the terminal device from the first access network. The method provided in this embodiment of this disclosure is relatively simple and is convenient to implement, thereby improving system efficiency.

In one embodiment, after operation 302, the method further includes the following operation:

Operation 303. The first core network element sends first instruction information to a second core network element, and the second core network element receives the first instruction information from the first core network element.

The first instruction information is used for at least one of the following two application scenario:

1. instructing the second core network element to determine an access type of a first PDU session as access from a second access network; and 2. instructing the second core network element to release a connection that is on the first access network and that corresponds to the first PDU session.

The first PDU session is a PDU session that is set up by the terminal device on the first access network and accessible on the second access network.

In the embodiments of this disclosure, the first PDU session may be one or more PDU sessions. Similarly, a second PDU session or a third PDU session may alternatively be one or more PDU sessions.

The foregoing application scenario 1 means that because the terminal device has been deregistered from the first access network, the first core network element instructs the second core network element to determine the access type of the first PDU session as access from the second access network, that is, the first PDU session may be accessed from the second access network, where the first PDU session is a PDU session that is set up by the terminal device on the first access network and accessible on the second access network. For example, when the first access network is a N3GPP access network, and the second access network is a 3GPP access network, the first PDU session is a PDU session that is set up on the N3GPP access network and accessible on the 3GPP access network. In the application scenario 1, the second core network element is instructed to modify the access type of the first PDU session on a core network side.

In a possible implementation, the second core network element may store information about a PDU session of the terminal device. Alternatively, the second core network element may obtain the information about the PDU session of the terminal device from a policy control network element (for example, a policy control function (PCF) network element).

In one embodiment, the information about the PDU session of the terminal device includes context information of the PDU session. The context information of the PDU session includes an identifier of the PDU session and at least one of the following information: a supported access type, an access type, a session setup mode, and the like.

In one embodiment, the information about the PDU session of the terminal device may include an identifier of the PDU session and an access type corresponding to the PDU session. Further, the access type corresponding to the PDU session may be flexibly set, provided that each PDU session corresponds to one access type.

The following provides descriptions by using an example in which the information about the PDU session of the terminal device includes context information and the context information includes an identifier of the PDU session, a supported access type, an access type, and a session setup mode. Table 1 shows the context information that is of the PDU session of the terminal device and that has not been modified by the second core network element.

TABLE 1

Context information that is of a PDU session of a terminal device and that has not been modified by a second core network element

| Identifier of a PDU session | Supported access type | Access type | Session setup mode |
|---|---|---|---|
| PDU session 1 | 3GPP access and N3GPP access | N3GPP access | N3GPP access network setup |
| PDU session 2 | 3GPP access and N3GPP access | 3GPP access | 3GPP access network setup |
| PDU session 3 | 3GPP access and N3GPP access | N3GPP access | 3GPP access network setup |
| PDU session 4 | 3GPP access and N3GPP access | 3GPP access | N3GPP access network setup |
| PDU session 5 | 3GPP access | 3GPP access | 3GPP access network setup |
| PDU session 6 | N3GPP access | N3GPP access | N3GPP access network setup |
| PDU session 7 | 3GPP access and N3GPP access | N3GPP access | N3GPP access network setup |
| PDU session 8 | N3GPP access | N3GPP access | N3GPP access network setup |
| PDU session 9 | 3GPP access and N3GPP access | 3GPP access | N3GPP access network setup |
| PDU session 10 | 3GPP access and N3GPP access | N3GPP access | N3GPP access network setup |
| ... | ... | ... | ... |

Based on Table 1, assuming that the first access network is a N3GPP access network, and the second access network is a 3GPP access network, the first PDU session is a PDU session 1, a PDU session 4, a PDU session 7, a PDU session 9, and a PDU session 10.

Based on the application scenario 1, the access type of the first PDU session in Table 1 is determined (or set) as 3GPP access. Modified Table 1 is shown in Table 2.

TABLE 2

Context information that is of a PDU session of a terminal device and that has been modified on a second core network element

| Identifier of a PDU session | Supported access type | Access type | Session setup mode |
|---|---|---|---|
| PDU session 1 | 3GPP access and N3GPP access | 3GPP access | N3GPP access network setup |
| PDU session 2 | 3GPP access and N3GPP access | 3GPP access | 3GPP access network setup |
| PDU session 3 | 3GPP access and N3GPP access | N3GPP access | 3GPP access network setup |
| PDU session 4 | 3GPP access and N3GPP access | 3GPP access | N3GPP access network setup |
| PDU session 5 | 3GPP access | 3GPP access | 3GPP access network setup |
| PDU session 6 | N3GPP access | N3GPP access | N3GPP access network setup |
| PDU session 7 | 3GPP access and N3GPP access | 3GPP access | N3GPP access network setup |
| PDU session 8 | N3GPP access | N3GPP access | N3GPP access network setup |
| PDU session 9 | 3GPP access and N3GPP access | 3GPP access | N3GPP access network setup |
| PDU session 10 | 3GPP access and N3GPP access | 3GPP access | N3GPP access network setup |
| ... | ... | ... | ... |

Certainly, if the first access network is a 3GPP access network, and the second access network is a N3GPP access network, a determining manner is similar, and details are not described again.

In the foregoing application scenario 2, the first core network element instructs the second core network element to release the connection that is on the first access network and that corresponds to the first PDU session. For example, the first core network element instructs the second core network element to release a user plane connection that is on the first access network and that corresponds to the first PDU session. Table 1 is used as an example. If the first access network is a N3GPP access network, and the second access network is a 3GPP access network, the second core network element releases a connection of the terminal device on the N3GPP access network. For example, referring to FIG. 1, a PDU session set up by the terminal device may be released on an N3 interface between the N3IWF network element and the UPF network element.

In one embodiment, after the second core network element performs a corresponding operation according to the first instruction information, the method further includes the following operation:

Operation 304. The second core network element sends response information to the first core network element, and the first core network element receives the response information from the second core network element.

The response information is acknowledgment information for the first instruction information.

In a possible implementation, the first core network element may alternatively explicitly instruct the terminal device to perform deregistration. For example:

Operation 305. The first core network element sends second instruction information to the terminal device, and the terminal device receives the second instruction information from the first core network element.

The second instruction information is used to instruct the terminal device to enter the deregistration state of the first access network. Corresponding to the second core network element, the first core network element can also instruct the terminal device to determine a PDU session accessible on the second access network, and correspondingly adjust the PDU session accessible on the second access network.

In one embodiment, after the first core network element sets the status information of the terminal device to deregistered from the first access network, the first core network element explicitly notifies the terminal device. Alternatively, the first core network element may explicitly notify the terminal device before operation 301 or between operation 301 and operation 302. This is not limited herein. A sequence of operation 305 and operations 301 to 304 is not limited in this embodiment of this disclosure.

Operation 306. The terminal device determines that the terminal device enters the deregistration state of the first access network.

In this operation, after the terminal device receives the second instruction information of the first core network element, the terminal device can determine that the terminal device enters the deregistration state of the first access network.

In another implementation, if the first core network element does not send the second instruction information to the terminal device after setting the status information of the terminal device to deregistered from the first access network on the core network side, it may be considered that the core network side implicitly deregisters the terminal device. In this case, the terminal device can still determine that the terminal device enters the deregistration state of the first access network. In an implementation, the terminal device determines that some interfaces on an access network side may be released. For example, when the first access network is a N3GPP access network, an interface (which may be referred to as an NWu interface) between the terminal device and the N3IWF network element is released. In this case, the terminal device enters an idle mode. When the terminal device is in the idle mode for a time period longer than a specified duration, the terminal device enters the deregistration state. In another implementation, after the NWu interface is released, the terminal device enters the deregistration state. Therefore, when the terminal device does not receive an explicit indication (the second instruction information shown in FIG. 3) from the first core network element, the terminal device can also determine that the terminal device enters the deregistration state of the first access network.

It should be noted that in an implementation, an apparatus that can perform timing, such as a timer or a counter, may be disposed in the terminal device, and may be configured to determine whether the terminal device is in the idle mode for a time period longer than the specified duration. For example, a deregistration timer, a deregistration counter, or the like may be disposed in the terminal device.

In this disclosure, if the first core network element sends the second instruction information to the terminal device, to instruct the terminal device to perform deregistration, this deregistration manner may be referred to as explicit deregistration. Conversely, if the first core network element does not send the second instruction information to the terminal device, this deregistration manner may be referred to as implicit deregistration.

Operation 307. The terminal device sets a status of the terminal device to deregistered from the first access network.

An implementation in which the terminal device sets the status of the terminal device to deregistered from the first access network may be similar to a related method in the first core network element (operation 302), and details are not described herein again.

In one embodiment, after operation 307, the method further includes the following operations.

Operation 308. The terminal device determines the PDU session accessible on the second access network.

Alternatively, operation 308 may be performed before operation 307. This is not limited herein.

Operation 309. The terminal device determines an access type of the PDU session that is set up by the terminal device on the first access network and accessible on the second access network as access from the second access network.

Operation 309 is an optional operation. For specific implementation, refer to operation 303.

For example, the terminal device may alternatively obtain context information of the PDU session 1 to the PDU session 10. The context information of the PDU session also includes information such as an identifier of the PDU session, a supported access type, an access type, and a session setup mode. It should be noted that, herein for ease of description, the information such as the identifier of the PDU session, the supported access type, the access type, and the session setup mode is considered as belonging to the context information of the PDU session. Actually, alternatively, the information may not be included in the context information of the PDU session, but is associated with the PDU session information. In other words, a PDU session has information such as an identifier of the PDU session, a supported access type, an access type, and a session setup mode corresponding to the PDU session.

In this embodiment, the terminal device may further initiate setup of a packet data unit PDU session on the second access network, where the PDU session is a PDU session that is set up on a first access network and accessible on the second access network. For example, the terminal device may send PDU session setup information to the first core network element by using the second access network.

In a possible implementation, after the terminal device receives the second instruction information of the first core network element, the terminal device initiates setup of the PDU session on the second access network, and then the terminal device determines that the terminal device enters the deregistration state of the first access network. Alternatively, after the terminal device determines that the terminal device is in the idle mode for a time period longer than the specified duration, the terminal device initiates setup of the PDU session on the second access network, and then the terminal device determines that the terminal device enters the deregistration state of the first access network.

In a possible implementation, the terminal device determines that the terminal device enters an idle mode of the first access network or the terminal device determines that the terminal device is in the idle mode of the first access network for a time period longer than the specified duration. The terminal device sends a request message on the second access network, where the request message includes information about a to-be-activated PDU session, and the information about the to-be-activated PDU session includes information about a PDU session set up by the terminal device on the first access network. In a possible implementation, the information about the to-be-activated PDU session is an identifier of the to-be-activated PDU session. The identifier of the to-be-activated PDU session may be included in a PDU session list. The information about the to-be-activated PDU session may include information about a to-be-activated PDU session that is set up by the terminal device on the first access network and that is to be activated on the second access network. In another possible implementation, the request message may include a service request message. The terminal device may further determine an access technology for the PDU session that is set up by the terminal device on the first access network and that is to be activated on the second access network as a technology of the second access network. In another possible implementation, after the terminal device receives the second instruction information of the first core network element, the terminal device determines that the terminal device enters the deregistration state of the first access network. Then, the terminal device initiates setup of the PDU session on the second access network. Alternatively, after the terminal device determines that the terminal device is in the idle mode for the time period longer than the specified duration, the terminal device determines that the terminal device enters the deregistration state of the first access network. Then, the terminal device initiates setup of the PDU session on the second access network.

In another possible implementation, after the first core network element releases the control plane connection to the first access network, if the timer expires, and the first core network element receives a request for PDU session setup initiated by the terminal device on the second access network, the first core network element determines that the terminal device enters the deregistration state of the first access network. Then, the first core network element sends a message (for example, the first instruction information, refer to operation 303) to the second core network element. The second core network element determines, based on the received message, the access type of the first PDU session as access from the second access network, and/or releases the connection that is on the first access network and that corresponds to the first PDU session, where the first PDU session is a PDU session that is set up by the terminal device on the first access network and accessible on the second access network. Alternatively, after the first core network element initiates the process of explicitly deregistering the terminal device, the first core network element determines that the terminal device enters the deregistration state of the first access network. Then, the first core network element sends a message (for example, the first instruction information, refer to operation 303) to the second core network element. The second core network element determines, based on the received message, the access type of the first PDU session as access from the second access network, and/or releases the connection that is on the first access network and that corresponds to the first PDU session, where the first PDU session is a PDU session that is set up by the terminal device on the first access network and accessible on the second access network.

In another possible implementation, after the first core network element releases the control plane connection to the first access network, if the timer expires, and the first core network element receives PDU session setup initiated by the terminal device on the second access network, the first core network element sends a message (for example, the first instruction information, refer to operation 303) to the second core network element. The second core network element determines, based on the received message, the access type of the first PDU session as access from the second access network, and/or releases the connection that is on the first access network and that corresponds to the first PDU session, where the first PDU session is a PDU session that is set up by the terminal device on the first access network and accessible on the second access network. Then, the first core network element determines that the terminal device enters the deregistration state of the first access network. Alternatively, after the first core network element initiates the process of explicitly deregistering the terminal device, the first core network element sends a message (for example, the first instruction information, refer to operation 303) to the second core network element. The second core network element determines, based on the received message, the access type of the first PDU session as access from the second access network, and/or releases the connection that is on the first access network and that corresponds to the first PDU session, where the first PDU session is a PDU session that is set up by the terminal device on the first access network and accessible on the second access network. Then, the first core network element determines that the terminal device enters the deregistration state of the first access network.

In another possible implementation, after the first core network element determines that the terminal device enters the deregistration state of the first access network, the first core network element sends the first instruction information to the second core network element, and the second core network element determines, based on the received first instruction information, the access type of the first PDU session as access from the second access network, and/or releases the connection that is on the first access network and that corresponds to the first PDU session, where the first PDU session is a PDU session that is set up by the terminal device on the first access network and accessible on the second access network. Then, the first core network element sets the status information of the terminal device to deregistered from the first access network. Alternatively, after the first core network element determines that the terminal device enters the deregistration state of the first access network, the first core network element sets the status information of the terminal device to deregistered from the first access network. Then, the first core network element sends the first instruction information to the second core network element, and the second core network element determines, based on the received first instruction information, the access type of the first PDU session as access from the second access network, and/or releases the connection that is on the first access network and that corresponds to the first PDU session, where the first PDU session is a PDU session that is set up by the terminal device on the first access network and accessible on the second access network.

In a possible case, context information that is of the PDU session of the terminal device and that is determined by the terminal device is the same as context information that is of the PDU session of the terminal device and that is determined on the core network side. For example, what is shown in Table 1 is also context information that is of the PDU session of the terminal device and that has not been modified on a terminal side. Correspondingly, in operation 308, the terminal device may modify the context information of the PDU session. Modified context information of the PDU session is shown in Table 2.

However, in an actual application, due to some reasons, the context information that is of the PDU session of the terminal device and that is determined by the terminal device on the terminal side may be out of synchronization with or inconsistent with the context information that is of the PDU session of the terminal device and that is determined on the core network side. Therefore, after operations in the foregoing method are performed to deregister the terminal device, the terminal device and the core network side modify a context of the PDU session of the terminal device differently.

For example, in the foregoing example, the information about the PDU session of the terminal device that is obtained by the terminal device on the terminal side device includes the context information of the PDU session 1 to the PDU session 10. For example, Table 3 shows the context information that is of the PDU session of the terminal device and that has not been modified on the terminal side.

TABLE 3

Context information that is of a PDU session of a terminal device and that has not been modified on a terminal side

| Identifier of a PDU session | Supported access type | Access type | Session setup mode |
| --- | --- | --- | --- |
| PDU session 1 | N3GPP access | N3GPP access | N3GPP access network setup |
| PDU session 2 | 3GPP access and N3GPP access | 3GPP access | 3GPP access network setup |
| PDU session 3 | 3GPP access and N3GPP access | N3GPP access | 3GPP access network setup |
| PDU session 4 | 3GPP access and N3GPP access | 3GPP access | N3GPP access network setup |
| PDU session 5 | 3GPP access | 3GPP access | 3GPP access network setup |
| PDU session 6 | N3GPP access | N3GPP access | N3GPP access network setup |
| PDU session 7 | 3GPP access and N3GPP access | N3GPP access | N3GPP access network setup |
| PDU session 8 | N3GPP access | N3GPP access | N3GPP access network setup |
| PDU session 9 | 3GPP access and N3GPP access | 3GPP access | N3GPP access network setup |
| PDU session 10 | 3GPP access and N3GPP access | N3GPP access | N3GPP access network setup |
| . . . | . . . | . . . | . . . |

In Table 3, for the PDU session 1, the terminal side learns that the access type supported by the PDU session is only N3GPP access. For example, assuming that the first access network is a N3GPP access network, a PDU session, namely, the second PDU session, that is set up by the terminal device on the first access network and accessible on the second access network and that is determined on the terminal side is the PDU session 4, the PDU session 7, the PDU session 9, and the PDU session 10. In this case, an access type of the second PDU session in Table 3 is determined (or set) as 3GPP access. Modified Table 3 is shown in Table 4.

TABLE 4

Context information that is of a PDU session of a terminal device and that has been modified on a terminal side

| Identifier of a PDU session | Supported access type | Access type | Session setup mode |
|---|---|---|---|
| PDU session 1 | 3GPP access and N3GPP access | N3GPP access | N3GPP access network setup |
| PDU session 2 | 3GPP access and N3GPP access | 3GPP access | 3GPP access network setup |
| PDU session 3 | 3GPP access and N3GPP access | N3GPP access | 3GPP access network setup |
| PDU session 4 | 3GPP access and N3GPP access | 3GPP access | N3GPP access network setup |
| PDU session 5 | 3GPP access | 3GPP access | 3GPP access network setup |
| PDU session 6 | N3GPP access | N3GPP access | N3GPP access network setup |
| PDU session 7 | 3GPP access and N3GPP access | 3GPP access | N3GPP access network setup |
| PDU session 8 | N3GPP access | N3GPP access | N3GPP access network setup |
| PDU session 9 | 3GPP access and N3GPP access | 3GPP access | N3GPP access network setup |
| PDU session 10 | 3GPP access and N3GPP access | 3GPP access | N3GPP access network setup |
| ... | ... | ... | ... |

Therefore, recorded context information of the PDU session of the terminal device in Table 4 obtained through modification is inconsistent with that in Table 2 obtained through modification. For example, the context information of the PDU session 1 in Table 2 and Table 4 is inconsistent.

In view of the possible problem, an embodiment of this disclosure further provides a PDU session handling method. The method may be used to negotiate context information of a PDU session between a terminal device and a core network side. In this disclosure, a negotiation process may be performed before the method shown in FIG. 3, or may be performed in the procedure shown in FIG. 3. This is not limited herein. The method includes the following operations.

Operation 401. The terminal device sends a first message to a first core network element, and the first core network element receives the first message from the terminal device.

In one embodiment, the first message may be non-access stratum (NAS) signaling or a NAS message.

In a possible implementation, the first message includes information about a to-be-activated PDU session, and the information about the to-be-activated PDU session includes information about a PDU session set up by the terminal device on the first access network. In a possible implementation, the information about the to-be-activated PDU session is an identifier of to-be-activated PDU session. The identifier of the to-be-activated PDU session may be included in a PDU session list. The information about the to-be-activated PDU session may include information about a to-be-activated PDU session that is set up by the terminal device on the first access network and that is to be activated on a second access network. In another possible implementation, the first message may be a service request message, and the to-be-activated PDU session specifically means that a user plane of the PDU session is to be activated.

Operation 402. The first core network element sends a second message to a second core network element based on the first message, and the second core network element receives the second message from the terminal device.

The second message is used by the second core network element to determine a third PDU session, and the third PDU session is a PDU session that is set up by the terminal device on the first access network and accessible on the second access network and that is determined by the second core network element. In one embodiment, the third PDU session may be a first PDU session.

Operation 403. The second core network element determines information about the third PDU session based on the second message.

In an implementation, the first message in operation 401 carries information about a second PDU session, and the second PDU session is a PDU session that is set up by the terminal device on the first access network and accessible on the second access network and that is determined by the terminal device. The second message in operation 402 also carries the information about the second PDU session, and the determining, by the second core network element, information about the third PDU session based on the second message specifically includes: determining, by the second core network element, the information about the third PDU session based on the information about the second PDU session. In other words, the second core network element may determine the information about the third PDU session based on the information about the second PDU session.

In another possible implementation, the information about the second PDU session includes a session that is set up by the terminal device on the first access network and to be activated on the second access network and that is determined by the terminal device. The second core network element determines a to-be-activated session based on the session that is set up by the terminal device on the first access network and that is to be activated on the second access network.

In one embodiment, the second core network element determines the information about the third PDU session based on the information about the second PDU session and information that is about the PDU session and that is determined by the second core network element. In one embodiment, the information about the PDU session determined by the second core network element may be information about a PDU session from a PCF network element. In one embodiment, the information of the third PDU session may be the same as the information about the second PDU session.

In a possible implementation, the information about the second PDU session and/or the information about the third PDU session includes: a context of the PDU session and/or an access type corresponding to the PDU session, and the context of the PDU session includes at least the access type corresponding to the PDU session. In this disclosure, the access type is not necessarily set in the context of the PDU session. For details, refer to descriptions of operation 303 or operation 309.

For example, the information that is about the PDU session and that is determined by the second core network element is information about the first PDU session. Referring to Table 3, the terminal device sends the information about the second PDU session (including information about the PDU session 4, information about the PDU session 7, information about the PDU session 9, and information about the PDU session 10) to the first core network element by using the first message. Then, the first core network element sends the information about the second PDU session to the second core network element by using the second message. Information about a PDU session may include information such as an access type of the PDU session, and in some embodiments may further include other information such as a session setup mode. The information about the first PDU session includes information about the PDU session 1, the information about the PDU session 4, the information about the PDU session 7, the information about the PDU session 9, and the information about the PDU session 10. In addition, the information about the second PDU session is exactly a subset of the information about the first PDU session. Therefore, in an example, the second core network element may use the information about the PDU session 4, the information about the PDU session 7, the information about the PDU session 9, and the information about the PDU session 10 as the information about the third PDU session. Certainly, in another example, the information about the third PDU session may be determined in another manner.

In another implementation, if the first message in operation 401 does not carry the information about the second PDU session, and the second message does not carry the information about the second PDU session either, the second core network element may directly determine the information about the first PDU session as the information about the third PDU session. In other words, the third PDU session is the first PDU session.

Operation 404. The second core network element sends the information about the third PDU session to the first core network element, and the first core network element receives the information about the third PDU session from the second core network element.

Operation 405. The first core network element sends the information about the third PDU session to the terminal device, and the terminal device receives the information about the third PDU session from the first core network element.

Operation 406. The terminal device determines a PDU session accessible on the second access network.

Because the third PDU session is a PDU session obtained after the terminal device negotiates with the core network side, PDU session synchronization can be maintained provided that both the core network side and a terminal side determine an access type of the third PDU session as access from the second access network.

Operation 407. The terminal device determines, as access from the second access network, an access type of a PDU session that is set up by the terminal device on the first access network and accessible on the second access network.

Specifically, the terminal device may determine an access technology for a PDU session that is set up by the terminal device on the first access network and that is to be activated on the second access network as a technology of the second access network.

Operation 407 is an optional operation. For details, refer to operation 302 or operation 309.

It should be noted that after operation 403 and before operation 407 is performed, or after operation 407 is performed, the method further includes: determining, by the second core network element, the access type of the third PDU session as access from the second access network, or determining an access type of the first PDU session as access from the second access network. For details, refer to operation 302 or operation 309.

This embodiment of this disclosure provides the deregistration method, including an implicit deregistration method and an explicit deregistration method, so that the terminal can be deregistered from the first access network, and determine (or set), as access from the second access network, the access type of the PDU session that is set up by the terminal device on the first access network and accessible on the second access network. In this way, some PDU sessions set up on the first access network may continue to be used on the first access network, thereby improving resource utilization.

The negotiation method provided in this embodiment of this disclosure may be completed before or after the deregistration method (including explicit deregistration and implicit deregistration) is performed, to ensure synchronization between PDU sessions that are set up by the terminal device on the first access network and accessible on the second access network and that are stored on the terminal side and the network side, thereby ensuring PDU session accuracy.

The embodiments of this disclosure provide a plurality of combinations of deregistration methods and negotiation methods, and may be flexibly used based on an actual requirement during specific implementation.

The foregoing mainly describes the solutions provided in the embodiments of this disclosure from a perspective of interaction between network elements. It may be understood that, to implement the foregoing functions, the first core network element, the second core network element, and the terminal device include corresponding hardware structures and/or software modules for performing the functions. A person skilled in the art should easily be aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 4:
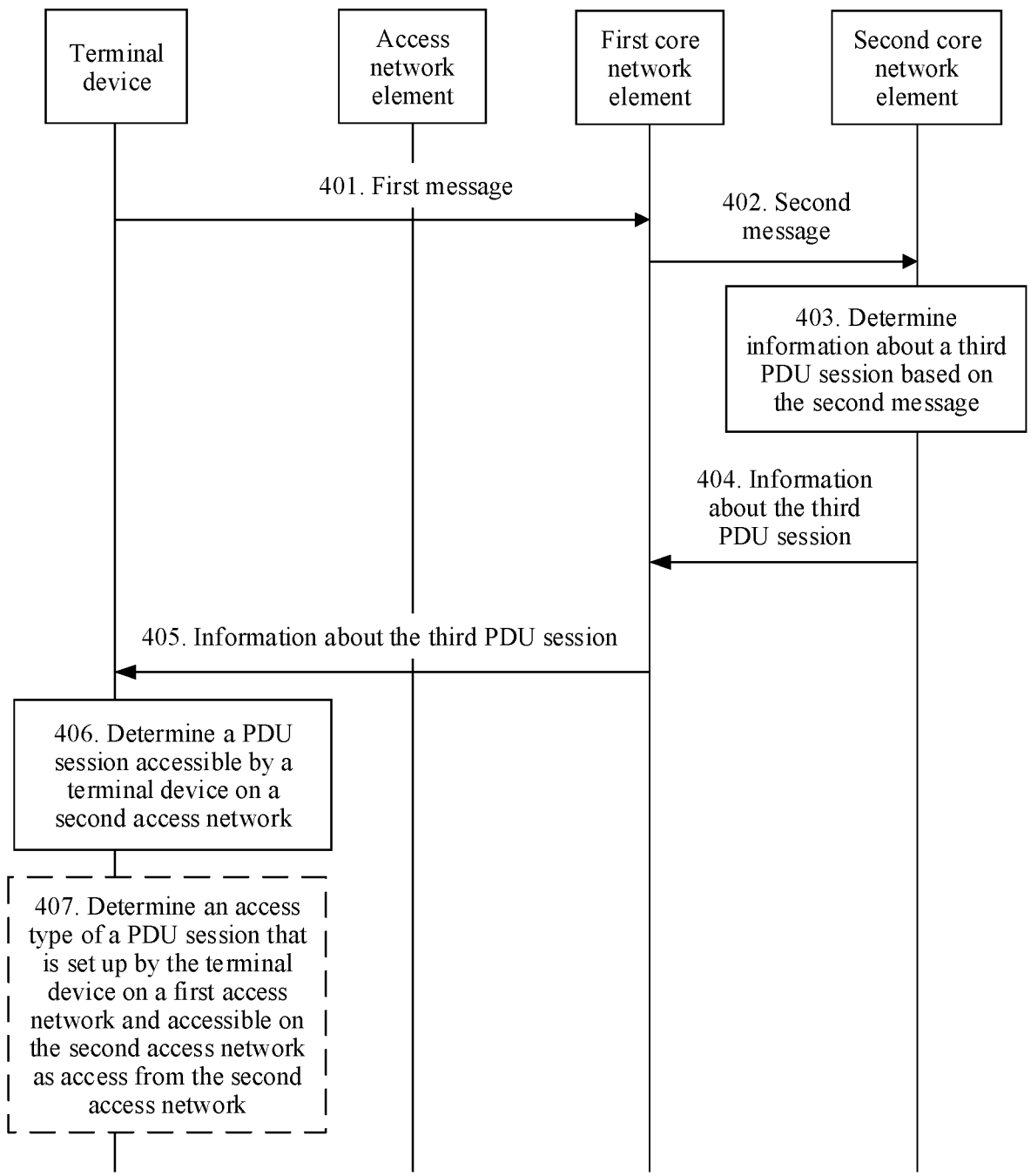
FIG. 4 is a schematic diagram of a PDU session handling method according to an embodiment of this disclosure.

The following describes a plurality of combined implementations with reference to the deregistration method shown in FIG. 3 and the PDU session handling method shown in FIG. 4.

The following describes the foregoing embodiments provided in this disclosure by using examples with reference to specific embodiments.

Figure 5:
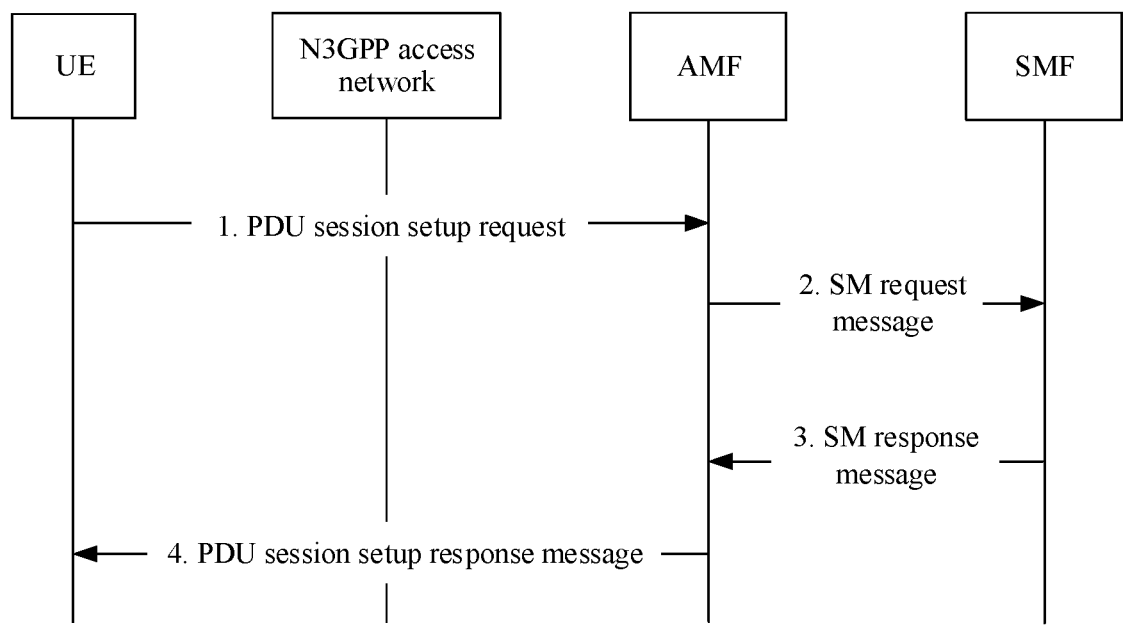
FIG. 5 is a schematic diagram of a PDU session handling method according to an embodiment of this disclosure.

FIG. 5 is a schematic diagram of a PDU session handling method according to an embodiment of this disclosure. UE is a terminal device, a N3GPP access network is a first access network, an N3IWF is a first access network element, a 3GPP access network is a second access network, an AMF network element is a first core network element, and an SMF is a second core network element. The method includes the following operations.

Operation 1. The UE sends a PDU session setup request message to the AMF network element by using the second access network.

The PDU session setup request message includes information about a second PDU session, for example, includes an identifier of the second PDU session, a supported access technology type, and an access technology type.

In a possible implementation, the PDU session setup request message includes an identifier of the PDU session.

Operation 2. The AMF network element sends a session management (SM) request message to the SMF network element.

The request message includes the information about the second PDU session.

The SMF network element determines a PDU session, namely, the third PDU session, that is set up by the terminal device on the N3GPP access network and accessible on the 3GPP access network. For a specific implementation, refer to the foregoing descriptions. Details are not described herein again.

Operation 3. The SMF network element sends an SM response message to the AMF network element.

The SM response message is used to instruct the AMF network element to complete a corresponding operation, and the SM response message includes information about the third PDU session.

In a possible implementation, the information about the third PDU session includes an identifier of the PDU session.

Operation 4. The AMF network element sends a PDU session setup response message to the UE.

The PDU session setup response message includes the information about the third PDU session.

After operation 4 is performed, the UE may determine, based on the third PDU session, a PDU session accessible on the 3GPP access network, and after operation 2 is performed, a network side also determines, based on the third PDU session, the PDU session accessible on the 3GPP access network, so that a session of the terminal device is consistent with that on the network side.

In a possible implementation, when the second core network element determines that the terminal device enters an idle mode of the first access network or the terminal device determines that the terminal device is in the idle mode of the first access network for a time period longer than a specified duration, if the second core network element receives notification information of a downlink data packet and needs to move a PDU session corresponding to the downlink data packet to the second access network, the second core network element triggers a paging process or sends a notification message to the terminal. After receiving a paging message or the notification message, the terminal device moves a PDU session set up on the first access network to the second access network, and initiates a service request on the second access network.

The second core network element may receive the notification information of the downlink data packet from a UPF network element. The PDU session corresponding to the downlink data packet is a PDU session that is set up on the first access network and accessible on the second access network.

Figure 6:
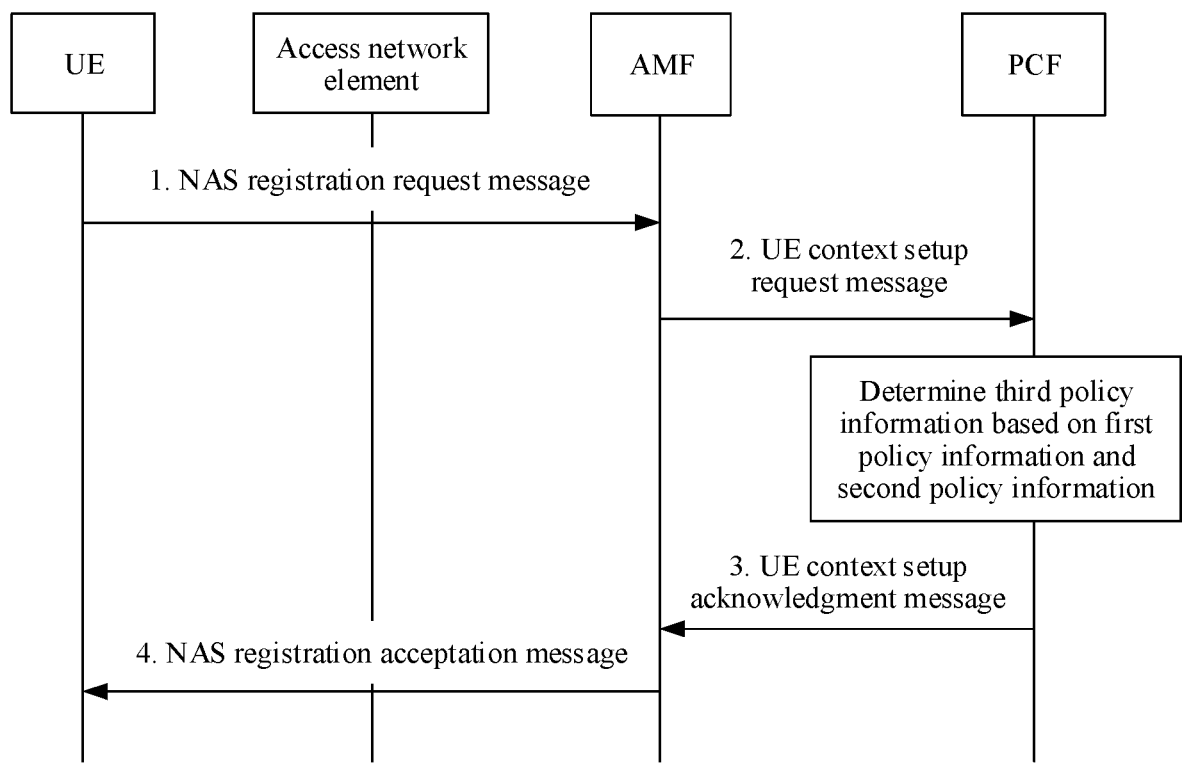
FIG. 6 is a schematic diagram of another PDU session handling method according to an embodiment of this disclosure.

FIG. 6 is a schematic diagram of another PDU session handling method according to an embodiment of this disclosure. UE is a terminal device, an access network element may be a 3GPP access network element or a N3GPP access network element, an AMF network element is a first core network element, and a PCF network element is a second core network element. The method includes the following operations.

Operation 1. The UE sends a NAS registration request message to the AMF network element.

The request message includes first policy information, and the first policy information includes: identification information of and an access type (3GPP access or N3GPP access) of an application that establishes a connection to a data network to perform a service of the application. A specific representation form of a policy is not limited, for example, an application identifier+3GPP, or an application identifier+N3GPP.

Operation 2. The AMF network element sends a UE context setup request message to the PCF network element.

The request message includes the first policy information. After receiving the first policy information, the PCF network element determines third policy information (identifier information and an access type of an application) based on the first policy information and second policy information (identifier information and an access type of an application) on a network side. A specific determining manner is not limited. For example, a common part of the first policy information and the second policy information is determined as the third policy information.

Operation 3. The PCF network element sends a UE context setup acknowledgment message to the AMF network element.

The acknowledgment message includes the third policy information.

Operation 4. The AMF network element sends a NAS registration acceptation message to the UE by using the access network element.

The acceptation message includes the third policy information, so that the UE uses the third policy information as policy information on a terminal side.

After operation 2 is performed, the network side also uses the third policy information as the policy information on the terminal side.

In an actual application, after the UE and the network side determine information about an application that accessible on the second access network, when the application is bound to a specific PDU session for transmission, the UE determines an access type of the PDU session to be the same as an access type of the application. For example, a PDU session a is used to transmit an application A, and the application A is an application that is established on the first access network and that can be transmitted on the second access network. In this case, after an access type of the application A is set as transmission on the second access network, an access type of the PDU session a includes access from the second access network. In other words, it is considered that the PDU session a may be used to transmit a data packet of the application on the second access network.

In this process, a UE side and the network side negotiate for information about a PDU session that is accessible on a 3GPP access network, avoiding a problem that information about a PDU session on the UE side is inconsistent with that on the network side.

Figure 7:
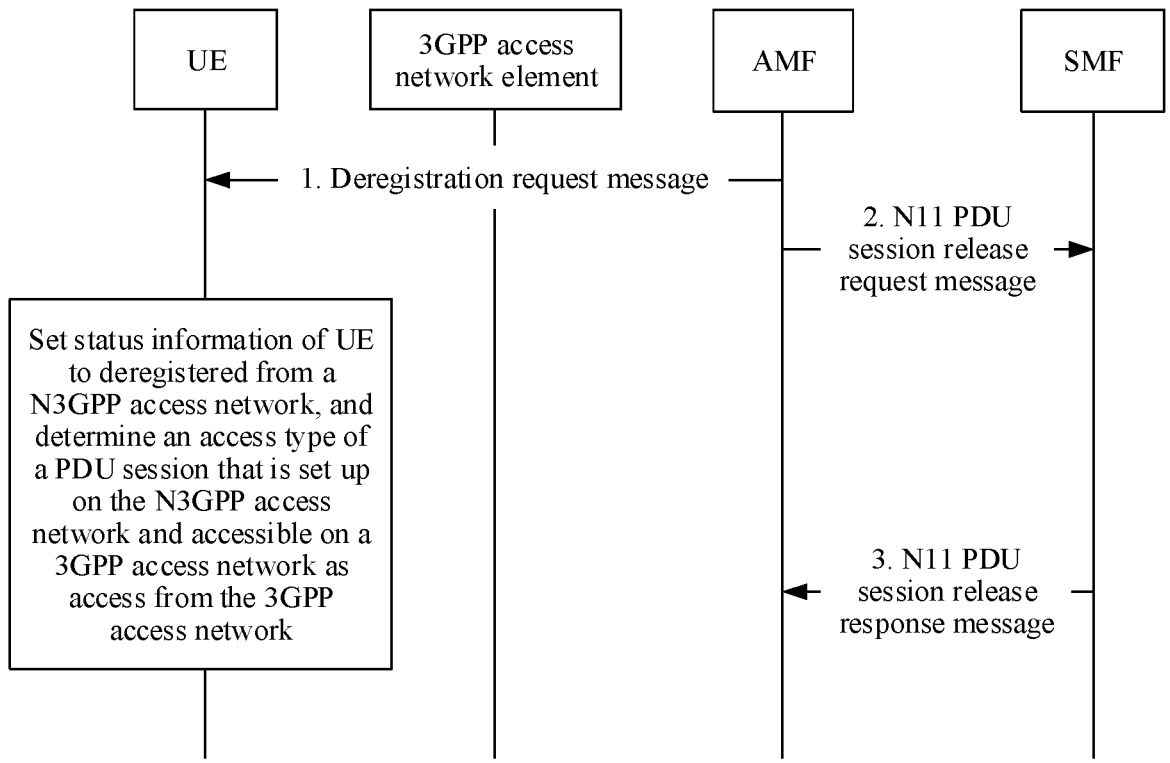
FIG. 7 is a schematic diagram of another deregistration method according to an embodiment of this disclosure.

According to the method shown in FIG. 5 or FIG. 6, the information about the PDU session between the terminal device and the network side can be consistent. Based on FIG. 5 or FIG. 6, a deregistration process may be further performed. FIG. 7 is a schematic diagram of another deregistration method according to an embodiment of this disclosure. For example, that the network side initiates, by using the 3GPP access network (the second access network), deregistration of the UE on the N3GPP access network (a first access network) includes the following operations.

Operation 1. The AMF network element sends a deregistration request message to the UE.

The request message includes a N3GPP deregistration instruction. After the UE receives the N3GPP deregistration instruction sent by the network side, the UE can sense that the UE is deregistered from the N3GPP access network. In this case, the UE determines an access type of a PDU session that is set up on the N3GPP access network and accessible on the 3GPP access network as access from the 3GPP access network. To be specific, when performing services by using these PDU sessions, the UE may establish a connection corresponding to an N3 interface of the 3GPP access network on the 3GPP access network by initiating a service request process.

The AMF network element further sets status information of the UE to deregistered from the N3GPP access network.

Operation 2. The AMF network element sends an N11 PDU session release request message to the SMF network element.

The message includes a N3GPP access deregistration instruction. A name of the instruction is not limited, and information that can have one of the following functions may be considered as the instruction information:

instructing the SMF network element to determine an access type of a PDU session that is set up on the N3GPP access network and accessible on the 3GPP access network as access from the 3GPP access network; or instructing the SMF network element to release a connection over an N3 interface (an interface between the N3IWF and the UPF network element) of a PDU session that is set up on the N3GPP access network and accessible on the 3GPP access network, and retains a connection over the N4 interface.

After receiving the N3GPP access deregistration instruction of the AMF network element, the SMF network element performs at least one of the foregoing two operations.

Operation 3. The SMF network element sends an N11 PDU session release response message to the AMF network element.

According to the method procedure shown in FIG. 7, the terminal device may be explicitly registered with the N3GPP access network.

Figure 8:
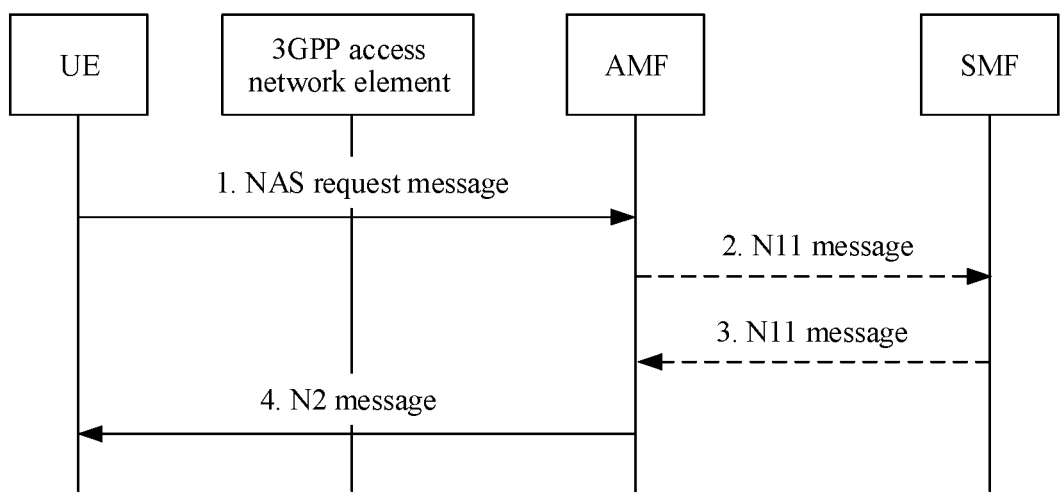
FIG. 8 is a schematic diagram of another PDU session handling method according to an embodiment of this disclosure.

In another implementation, operation 1 is not performed in the procedure shown in FIG. 7, only the following operations are performed: setting, by the AMF network element, the status information of the UE to deregistered from the N3GPP access network, operation 2 and operation 3, that is, implicitly deregistering the UE from the N3GPP access network. In this case, a PDU session of the UE may be further updated by using a method procedure shown in FIG. 8. FIG. 8 is a schematic diagram of another PDU session handling method according to an embodiment of this disclosure. The method includes the following operations.

Operation 1. The UE sends a NAS request message to the AMF network element.

In one embodiment, the request message includes a second PDU session.

Operation 2. The AMF network element sends an N11 message to the SMF network element.

The message includes a N3GPP deregistration instruction, and a function of the instruction is:

instructing the SMF network element to determine a PDU session that can be set up on the N3GPP access network and accessible on the 3GPP access network.

In one embodiment, if operation 2 and operation 3 are not performed in FIG. 7 in the implicit deregistration process, the N3GPP deregistration instruction in operation 2 shown in FIG. 8 further has at least one of the following functions:

instructing the SMF network element to determine an access type of a PDU session that is set up on the N3GPP access network and accessible on the 3GPP access network as access from the 3GPP access network; or instructing the SMF network element to release a connection over an N3 interface (an interface between the N3IWF and the UPF network element) of a PDU session that is set up on the N3GPP access network and accessible on the 3GPP access network, and retains a connection over the N4 interface.

Operation 3. The SMF network element sends an N11 message to the AMF network element.

The message includes information about a third PDU session.

Operation 4. The AMF network element sends an N2 message to the UE by using the 3GPP access network element.

The message includes the information about the third PDU session, and may be used by the UE to update the access type of the PDU session that is set up by the UE on the N3GPP access network and accessible on the 3GPP access network.

In another implementation, if the PDU session handling methods shown in FIG. 5 and FIG. 6 are not performed, and the explicit or implicit deregistration procedure shown in FIG. 7 is directly performed first, the PDU session between the terminal side and the network side may be synchronized in the procedure shown in FIG. 8.

In another implementation, alternatively, the PDU session handling method shown in FIG. 8 may be directly performed without performing the PDU session handling methods shown in FIG. 5 and FIG. 6, or without performing the explicit or implicit deregistration procedure shown in FIG. 7, but the deregistration process shown in FIG. 7 is added to the procedure shown in FIG. 8. For example, operations performed in operation 2 and operation 3 shown in FIG. 7 are added to operation 2 and operation 3 shown in FIG. 8, and the following operations are added to FIG. 8: The AMF network element sets the status information of the UE to deregistered from the N3GPP access network, to directly complete deregistration and synchronization of the PDU session between the terminal side and the network side in the procedure shown in FIG. 8.

The various deregistration methods and PDU session handling methods provided in the embodiments of this disclosure may be used to deregister a connection of the terminal device on the first access network from the second access network. The deregistration methods include explicit deregistration and implicit deregistration, and further include synchronization of (or referred to as negotiation for) the PDU session between the terminal side and the network side. There are a plurality of variation combinations based on different execution sequences of the two procedures, thereby resolving a prior-art problem that a connection of the terminal device on the first access network cannot be deregistered from the second access network. Further, the methods provided in the embodiments of this disclosure are relatively simple and are convenient to implement, thereby improving system efficiency.

In the embodiments of this disclosure, the terminal device may initiate setup of the PDU session on the second access network. The PDU session is a PDU session that is set up on the first access network and accessible on the second access network and that is determined by the terminal device. For example, the terminal device may send the PDU session setup information to the first core network element by using the second access network. Correspondingly, the terminal device first determines the PDU session that is set up by the terminal device on the first access network and accessible on the second access network (for details, refer to the descriptions in the embodiments in FIG. 4 to FIG. 8). The terminal device may determine, at any moment before the second access network initiates the setup of the PDU session, the PDU session that is set up on the first access network and accessible on the second access network. This is not limited herein.

In an embodiment of this disclosure, a deregistration apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in the embodiments of this disclosure, module division is an example, and is merely a logical function division. During actual implementation, another division manner may be used.

Figure 9:
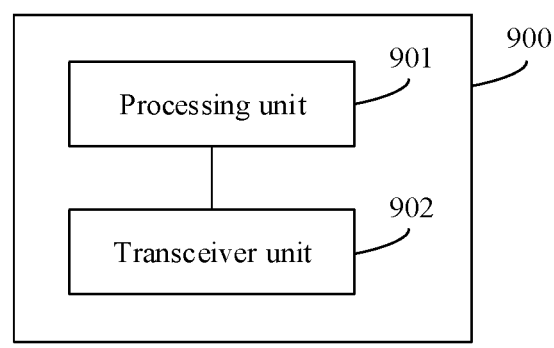
FIG. 9 shows another deregistration apparatus according to an embodiment of this disclosure.

For example, when each functional module is obtained through division based on each corresponding function, FIG. 9 is a possible schematic structural diagram of the deregistration apparatus in the foregoing embodiment. The apparatus 900 may be the first core network element, the second core network element, or the terminal device in the foregoing embodiments. The apparatus 900 includes a processing unit 901 and a transceiver unit 902. The transceiver unit 902 is used by the processing unit 901 to send and receive a signal.

When the apparatus 900 is the first core network element, the processing unit 901 determines that a terminal device enters a deregistration state of a first access network, and the processing unit 901 sets the status information of the terminal device to deregistered from the first access network.

In one embodiment, the transceiver unit 902 sends first instruction information to a second core network element, where the first instruction information is used to instruct the second core network element to determine an access type of a first packet data unit PDU session as access from a second access network; and/or the first instruction information is used to instruct the second core network element to release a connection that is on the first access network and that corresponds to the first PDU session, and the first PDU session is a PDU session that is set up by the terminal device on the first access network and accessible on the second access network.

In another implementation, the processing unit 901 determines that a terminal device enters a deregistration state of a first access network, and the transceiver unit 902 sends first instruction information to a second core network element, where the first instruction information is used to instruct the second core network element to determine an access type of a first packet data unit PDU session as access from the second access network; and/or the first instruction information is used to instruct the second core network element to release a connection that is on the first access network and that corresponds to the first PDU session, and the first PDU session is a PDU session that is set up by the terminal device on the first access network and accessible on the second access network.

In one embodiment, the transceiver unit 902 receives a first message sent by the terminal device on the second access network, and the first core network element sends a second message to the second core network element based on the first message, where the second message is used by the second core network element to determine a PDU session that is set up by the terminal device on the first access network and accessible on the second access network.

In one embodiment, the second message includes the first instruction information.

In one embodiment, the PDU session that is set up by the terminal device on the first access network and accessible on the second access network and that is determined by the second core network element is the first PDU session.

In one embodiment, the first message and the second message include information about a second PDU session, and the second PDU session is a PDU session that is set up by the terminal device on the first access network and accessible on the second access network and that is determined by the terminal device.

In one embodiment, the PDU session that is set up by the terminal device on the first access network and accessible on the second access network and that is determined by the second core network element is determined by the second core network element based on the information about the second PDU session.

In one embodiment, the transceiver unit 902 receives information about a third PDU session from the second core network element, where the third PDU session is a PDU session that is set up by the terminal device on the first access network and accessible on the second access network and that is determined by the second core network element; and the first core network element sends the information about the third PDU session to the terminal device.

In one embodiment, the transceiver unit 902 sends second instruction information to the terminal device, where the second instruction information is used to instruct the terminal device to determine a PDU session accessible on the second access network.

In one embodiment, the information about the second PDU session and/or the information about the third PDU session includes a context of the PDU session and/or an access type corresponding to the PDU session, and the context of the PDU session includes at least the access type corresponding to the PDU session.

In one embodiment, the status information of the terminal device is status information in the context of the PDU session.

When the apparatus 900 is the terminal device, the processing unit 901 determines that the terminal device enters a deregistration state of a first access network, and the processing unit 901 sets a status of the terminal device to deregistered from the first access network.

In one embodiment, if the terminal device is in an idle mode for a time period longer than a specified duration, the processing unit 901 determines that the terminal device enters the deregistration state of the first access network; or if the transceiver unit 902 receives second instruction information from a first core network element, the processing unit 901 determines, according to the second instruction information, that the terminal device enters the deregistration state of the first access network.

In one embodiment, the transceiver unit 902 receives information about a third PDU session from a second core network element, where the third PDU session is a PDU session that is set up by the terminal device on the first access network and accessible on a second access network and that is determined by the second core network element; and the processing unit 901 determines, based on the information about the third PDU session, a PDU session accessible on the second access network.

In one embodiment, the transceiver unit 902 sends information about a second PDU session to the second core network element on the second access network, where the second PDU session is a PDU session that is set up by the terminal device on the first access network and accessible on the second access network and that is determined by the terminal device, and the third PDU session is determined by the second core network element based on the information about the second PDU session.

In one embodiment, the processing unit 901 determines, as a technology of the second access network, an access technology for a PDU session that is set up by the terminal device on the first access network and accessible on the second access network.

In one embodiment, the information about the second PDU session and/or the information about the third PDU session includes a context of the PDU session and/or an access type corresponding to the PDU session.

In one embodiment, status information of the terminal device is status information in the context of the PDU session.

In another embodiment, when the apparatus 900 is the terminal, the processing unit 901 and the transceiver unit 902 in the apparatus 900 may be further configured to perform the following operations:

The processing unit 901 is configured to determine that the terminal device is in an idle mode for a time period longer than a specified duration.

The processing unit 901 is further configured to initiate setup of a packet data unit PDU session on a second access network, where the PDU session is a PDU session that is set up on a first access network and accessible on the second access network.

The processing unit 901 is further configured to determine that the apparatus enters a deregistration state of the first access network.

In one embodiment, the processing unit 901 is further configured to:

determine the PDU session that is set up on the first access network and accessible on the second access network.

In one embodiment, the transceiver unit is configured to receive information about a third PDU session from a second core network element, where the third PDU session is a PDU session that is set up by the terminal device on the first access network and accessible on the second access network and that is determined by the second core network element.

The processing unit 901 is configured to determine, based on the information about the third PDU session, the PDU session that is set up by the terminal device on the first access network and accessible on the second access network.

In one embodiment, the transceiver unit 902 is configured to send information about a second PDU session to the second core network element on the second access network, where the second PDU session is a PDU session that is set up by the terminal device on the first access network and accessible on the second access network and that is determined by the terminal device, and the third PDU session is determined by the second core network element based on the information about the second PDU session.

In one embodiment, the processing unit 901 is configured to determine an access type of a PDU session that is set up by the terminal device on the first access network and accessible on the second access network as access from the second access network.

In one embodiment, the processing unit 901 is further configured to set a status of the terminal device to deregistered from the first access network.

When the apparatus 900 is the second core network element, the transceiver unit 902 receives first instruction information from a first core network element. The second core network element determines, according to the first instruction information, an access type of a first packet data unit PDU session as access from a second access network, and/or releasing a connection that is on a first access network and that corresponds to the first PDU session, where the first PDU session is a PDU session that is set up by a terminal device on the first access network and accessible on the second access network.

In one embodiment, the transceiver unit 902 sends information about a third PDU session to the terminal device, where the third PDU session is a PDU session that is set up by the terminal device on the first access network and accessible on the second access network and that is determined by the second core network element.

In one embodiment, the transceiver unit 902 receives information about a second PDU session from the terminal device, where the second PDU session is a PDU session that is set up by the terminal device on the first access network and accessible on the second access network and that is determined by the terminal device.

The processing unit 901 determines the information about the third PDU session based on the information about the second PDU session.

In one embodiment, the first PDU session is the second PDU session or the third PDU session.

In an embodiment of this disclosure, a PDU session handling apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in the embodiments of this disclosure, module division is an example, and is merely a logical function division. During actual implementation, another division manner may be used.

Figure 10:
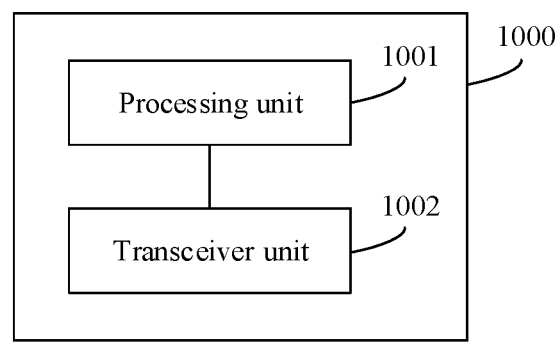
FIG. 10 shows another deregistration apparatus according to an embodiment of this disclosure.

For example, when each functional module is obtained through division based on each corresponding function, FIG. 10 is a possible schematic structural diagram of the PDU session handling apparatus in the foregoing embodiment. The apparatus 1000 may be the second core network element in the foregoing embodiment. The apparatus 1000 includes a processing unit 1001 and a transceiver unit 1002. The transceiver unit 1002 is used by the processing unit 1001 to send and receive a signal.

The transceiver unit 1002 receives information about a second PDU session from a terminal device, where the second PDU session is a PDU session that is set up by the terminal device on a first access network and accessible on a second access network and that is determined by the terminal device. The processing unit 1001 determines information about a third PDU session based on the information about the second PDU session, where the third PDU session is a PDU session that is set up by the terminal device on the first access network and accessible on the second access network and that is determined by the second core network element. The second core network element sends the information about the third PDU session to the terminal device. In this method, PDU session synchronization between the terminal side and the network side can be completed.

In another implementation of the PDU session handling apparatus, the processing unit 1001 is configured to determine that the session handling apparatus enters an idle mode of a first access network or is in the idle mode of the first access network for a time period longer than a specified duration. The transceiver unit 1002 is configured to send a request message on a second access network, where the request message includes information about a to-be-activated PDU session, and the information about the to-be-activated PDU session includes information about a PDU session set up by the session handling apparatus on the first access network.

In a possible implementation, the request message includes a service request message.

In another possible implementation, the processing unit 1001 is further configured to determine an access technology for a PDU session that is set up by the session handling apparatus on the first access network and that is to be activated on the second access network as a technology of the second access network.

In the embodiments, the apparatus is presented in a form in which each functional module is obtained through division based on each corresponding function, or the apparatus is presented in a form in which each functional module is obtained through division in an integrated manner. The "module" herein may be an application-specific integrated circuit (ASIC), a processor and a memory that execute one or more software or firmware programs, an integrated logic circuit, and/or another device that can provide the foregoing functions. In a simple embodiment, a person skilled in the art may figure out that the deregistration apparatus 900 may be in a form shown in FIG. 2. For example, the processing unit 901 and the transceiver unit 902 in FIG. 9 may be implemented by using the processor 21 (and/or the processor 28) and the memory 23 in FIG. 2. Specifically, the processing unit 901 and the transceiver unit 902 may be implemented by invoking, by the processor 21 (and/or the processor 28), the application program code stored in the memory 23. This is not limited in the embodiments of this disclosure. In a simple embodiment, a person skilled in the art may figure out that the PDU session handling apparatus 1000 may be in a form shown in FIG. 2. For example, the processing unit 1001 and the transceiver unit 1002 in FIG. 10 may be implemented by using the processor 21 (and/or the processor 28) and the memory 23 in FIG. 2. Specifically, the processing unit 1001 and the transceiver unit 1002 may be implemented, by the processor 21 (and/or the processor 28), the application program code stored in the memory 23. This is not limited in the embodiments of this disclosure.

A specific implementation of the foregoing apparatus embodiments corresponds to that of the method embodiments. For the specific implementation and beneficial effects of the apparatus embodiments, refer to related descriptions in the method embodiments.

An embodiment of this disclosure further provides a computer storage medium, storing a computer software instruction used by the deregistration apparatuses shown in FIG. 2 and FIG. 9, where the computer software instruction includes program code designed to perform the foregoing method embodiments. The terminal device may be deregistered by executing the stored program code.

An embodiment of this disclosure further provides a computer storage medium, storing a computer software instruction used by the PDU session handling apparatuses shown in FIG. 10, where the computer software instruction includes program code designed to perform the foregoing method embodiments. PDU session handling may be implemented by executing the stored program code.

An embodiment of this disclosure further provides a computer program product. The computer program product includes a computer software induction, where the computer software induction may be loaded by a processor to implement a method in the foregoing method embodiments.

An embodiment of this disclosure further provides a chip. The chip includes a processor and a transceiver component, and in some embodiments may further includes a storage unit, to perform a method in the foregoing embodiments of this disclosure.

Figure 11:
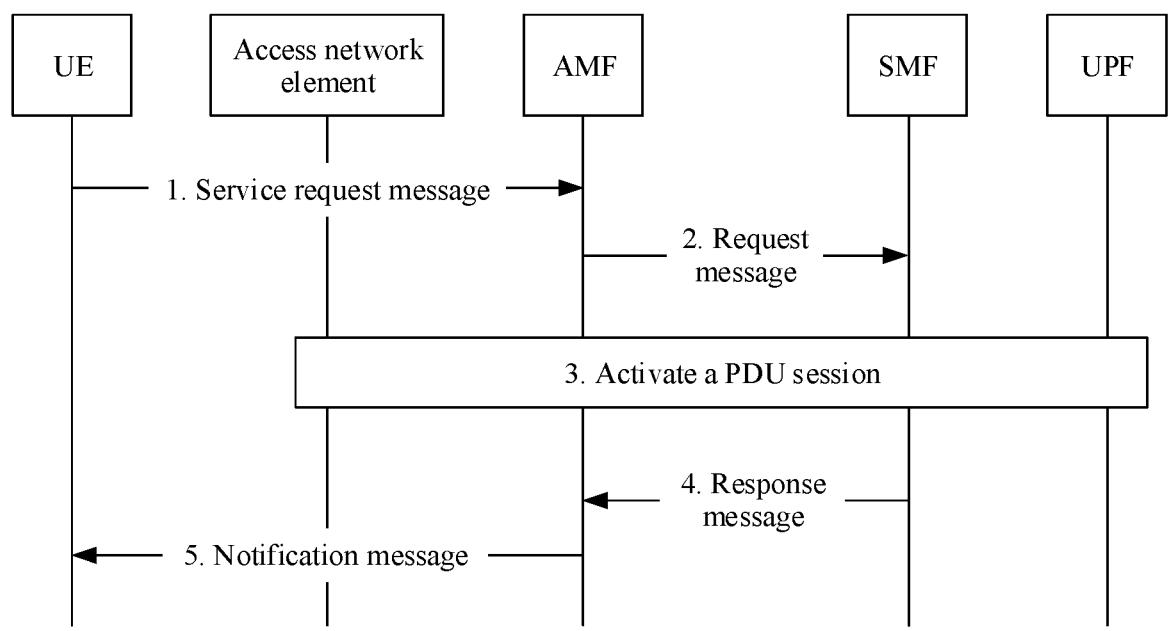
FIG. 11 is a schematic diagram of still another PDU session handling method according to an embodiment of this disclosure.

FIG. 11 is a schematic diagram of still another PDU session handling method according to an embodiment of this disclosure. In this embodiment, an example in which a terminal device is UE, a first access network is a N3GPP access network, a second access network is a 3GPP access network, a first core network element is an AMF network element, and a second core network element is an SMF network element is used for description. Specifically, the method includes the following operations.

Operation 1. The UE sends a service request message to the AMF network element by using the second access network. Correspondingly, the AMF network element may receive the service request message by using the second access network.

In a possible implementation, the service request message includes information about a to-be-activated PDU session. The information about the to-be-activated PDU session includes an identifier of the PDU session. The to-be-activated PDU session may be a PDU session that is set up on the first access network and that needs to be activated on the second access network. The to-be-activated PDU session may mean that a user plane of the to-be-activated PDU session is to be activated. Specifically, the PDU session that is set up on the first access network and needs to be activated on the second access network and that is determined by the terminal may be triggered when a terminal side needs to send an uplink data packet based on the PDU session.

Operation 2. The AMF network element sends a request message to the SMF network element. Correspondingly, the SMF network element may receive the request message.

The request message includes the information about the to-be-activated PDU session. The information about the to-be-activated PDU session includes the identifier of the PDU session.

In a possible implementation, the request message is a session context update request message. Alternatively, the request message may be another service request message. This is not limited herein.

Operation 3. The SMF network element activates the to-be-activated PDU session based on the request message sent by the AMF.

Specifically, the SMF network element activates the user plane of the to-be-activated PDU session. If the activation succeeds, the SMF may update an access technology type in the context of the session.

In another possible implementation, the SMF network element determines information about a PDU session that is set up by the UE on the first access network and accessible on the second access network. Information about the PDU session includes an identifier of the PDU session. The identifier of the PDU session may be a PDU session ID or N3 tunnel information.

The SMF network element may determine, based on the information about the PDU session in the request message, the information about the PDU session that is set up by the UE on the first access network and accessible on the second access network.

Operation 4. The SMF network element sends a response message of the request message to the AMF network element. Correspondingly, the AMF network element may receive the request message.

In a possible implementation, the response message is a session context update response message. Alternatively, the response message may be another service response message. This is not limited herein.

The response message may include information about a PDU session that is set up by the UE on the first access network and accessible on the second access network and that is determined by the SMF network element. Specifically, the information about the PDU session includes an identifier of the PDU session. Alternatively, the response message may include information about a PDU session activated by the SMF network element. In another possible implementation, the response message includes status information of a PDU session, for example, user plane activation or user plane deactivation.

Operation 5. The AMF sends a notification message to the UE by using the second access network. Correspondingly, the UE may receive the notification message.

The notification message may be a NAS message.

The notification message includes information about a PDU session that is set up by the UE on the first access network and accessible on the second access network and that is determined by the SMF network element.

After receiving the notification message, the UE determines the information about the PDU session that is set up on the first access network and accessible on the second access network. Specifically, the UE may update an access technology in context information of the PDU session to an access technology of the second access network.

In this embodiment, for how the UE and the SMF network element determine the information about the PDU session that is set up by the terminal device on the first access network and accessible on the second access network, refer to descriptions of related operations in the embodiment in FIG. 3.

This disclosure may provide the following implementation:

1. A deregistration method, including:
determining, by a first core network element, that a terminal device enters a deregistration state of a first access network; and
setting, by the first core network element, the status information of the terminal device to deregistered from the first access network.

2. The method according to implementation 1, where the method further includes:
sending, by the first core network element, first instruction information to a second core network element, where the first instruction information is used to instruct the second core network element to determine an access technology for one or more first packet data unit PDU sessions as a technology of a second access network; and/or the first instruction information is used to instruct the second core network element to release a connection that is on the first access network and that corresponds to the first PDU session, and the first PDU session is a PDU session that is set up by the terminal device on the first access network and accessible on the second access network.

3. The method according to implementation 1 or 2, where the method further includes:
receiving, by the first core network element, a first message sent by the terminal device on the second access network; and
sending, by the first core network element, a second message to the second core network element based on the first message, where the second message is used by the second core network element to determine a PDU session that is set up by the terminal device on the first access network and accessible on the second access network.

4. The method according to implementation 3, where the second message includes the first instruction information.

5. The method according to implementation 3 or 4, where the PDU session that is set up by the terminal device on the first access network and accessible on the second access network and that is determined by the second core network element is the first PDU session.

6. The method according to any one of implementations 3 to 5, where the first message and the second message include information about a second PDU session, and the second PDU session is a PDU session that is set up by the terminal device on the first access network and accessible on the second access network and that is determined by the terminal device.

7. The method according to implementation 6, where the PDU session that is set up by the terminal device on the first access network and accessible on the second access network and that is determined by the second core network element is determined by the second core network element based on the information about the second PDU session.

8. The method according to any one of implementations 3 to 7, where the method further includes:
receiving, by the first core network element, information about a third PDU session from a second core network element, where the third PDU session is a PDU session that is set up by the terminal device on the first access network and accessible on the second access network and that is determined by the second core network element; and
sending, by the first core network element, the information about the third PDU session to the terminal device.

9. The method according to any one of implementations 2 to 8, where the method further includes:
sending, by the first core network element, second instruction information to the terminal device, where the second instruction information is used to instruct the terminal device to determine a PDU session accessible on the second access network.

Although this disclosure is described with reference to the embodiments, in a process of implementing this disclosure that claims protection, a person skilled in the art may understand and implement another variation of the disclosed embodiments by viewing the accompanying drawings, disclosed content, and accompanying claims. In the claims, "comprising" does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this disclosure may be provided as a method, an apparatus (a device), or a computer program product. Therefore, this disclosure may use a form of hardware only embodiments, software only embodiments, or embodiments with a combination of software and hardware. They are collectively referred to as "modules" or "systems". Moreover, this disclosure may use a form of a computer program product that is implemented on one or more computer-usable storage media (including but not limited to a disk memory, a CD-ROM, an optical memory, and the like) that include computer usable program code. The computer program product is stored/distributed in a proper medium and is provided as or used as a part of the hardware together with another hardware, or may also use another distribution form, such as by using the Internet or another wired or wireless telecommunications system.

This disclosure is described with reference to the flowcharts and/or block diagrams of the methods, the apparatuses (devices), and the computer program products according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although this disclosure is described with reference to specific features and the embodiments thereof, obviously, various modifications and combinations may be made to them without departing from the scope of this disclosure. Correspondingly, the specification and accompanying drawings are merely example description of this disclosure defined by the accompanying claims, and is considered as any of or all modifications, variations, combinations or equivalents that cover the scope of this disclosure. Obviously, a person skilled in the art can make various modifications and variations to this disclosure without departing from the scope of this disclosure. This disclosure is intended to cover these modifications and variations of this disclosure provided that they fall within the scope of the claims of this disclosure and their equivalent technologies.

What is claimed is:

1. A deregistration method, comprising:
   determining, by a terminal device, that the terminal device enters a deregistration state of a first access network;
   setting, by the terminal device, a status of the terminal device to deregistered from the first access network;
   sending, by the terminal device, information about a second packet data unit (PDU) session to a second core network element on a second access network, wherein the second PDU session is a PDU session that is set up by the terminal device on the first access network and accessible on the second access network and that is determined by the terminal device;
   receiving, by the terminal device, information about a third packet data unit (PDU) session from the second core network element, wherein the third PDU session is a PDU session that is set up by the terminal device on the first access network and accessible on the second access network and that is determined by the second core network element; and
   synchronizing inconsistent information about the second PDU session between the terminal device and the second core network element based on the information about the third PDU session.

2. The method according to claim 1, wherein the determining, by a terminal device, that the terminal device enters a deregistration state of a first access network comprises:
   if the terminal device is in an idle mode for a time period longer than a predetermined duration, determining, by the terminal device, that the terminal device enters the deregistration state of the first access network; or
   if the terminal device receives second instruction information from a first core network element, determining, by the terminal device according to the second instruction information, that the terminal device enters the deregistration state of the first access network.

3. The method according to claim 1, further comprising:
   determining, by the terminal device based on the information about the third PDU session, a PDU session accessible on the second access network.

4. The method according to claim 1, further comprising:
   determining, by the terminal device, an access type of a PDU session that is set up by the terminal device on the first access network and accessible on the second access network as access from the second access network.

5. The method according to claim 1, wherein a first core network element is to send a first instruction information to the second core network element, wherein the first instruction information instructs the second core network element to release a connection that is on the first access network and that corresponds to a first PDU session, wherein the first PDU session is set up by the terminal device on the first access network and accessible on the second access network.

6. The method according to claim 1, further comprising:
   receiving a second instruction information from the first core network element;
   determine a PDU session accessible on the second access network based on the second instruction information; and
   adjusting an access type in context information of the PDU session accessible on the second access network based on the second instruction information.

7. The method according to claim 1, further comprising:
   obtaining context information of a plurality of PDU sessions comprising the second PDU session, wherein the context information includes an identifier, a supported access type, an access type, and a session setup mode corresponding to each of the plurality of PDU sessions.

8. The method according to claim 1, further comprising:
   sending a service request message to the second core network element over the second access network, wherein the service request message is a session context update request message requesting for an access type corresponding to a context of the second PDU session to be updated.

9. A terminal device, comprising:
   at least one processor coupled with a memory, wherein the at least one processor is configured to execute instructions stored in the memory, to enable the terminal device to perform the following operations:

determining that the terminal device enters a deregistration state of a first access network;

setting a status of the terminal device to deregistered from the first access network;

sending information about a second packet data unit (PDU) session to a second core network element on a second access network, wherein the second PDU session is a PDU session that is set up by the terminal device on the first access network and accessible on the second access network and that is determined by the terminal device;

receiving information about a third packet data unit (PDU) session from the second core network element, wherein the third PDU session is a PDU session that is set up by the terminal device on the first access network and accessible on a second access network and that is determined by the second core network element; and synchronizing inconsistent information about the second PDU session between the terminal device and the second core network element based on the information about the third PDU session.

10. The terminal device according to claim 9, wherein the determining that the terminal device enters a deregistration state of a first access network comprises:

if the terminal device is in an idle mode for a time period longer than a predetermined duration, determining that the terminal device enters the deregistration state of the first access network; or if the terminal device receives second instruction information from a first core network element, determining, according to the second instruction information, that the terminal device enters the deregistration state of the first access network.

11. The terminal device according to claim 9, wherein the operations further comprise:

determining, based on the information about the third PDU session, a PDU session accessible on the second access network.

12. The terminal device according to claim 9, wherein the operations further comprise:

determining an access type of a PDU session that is set up by the terminal device on the first access network and accessible on the second access network as access from the second access network.

13. A terminal device, comprising:

at least one processor coupled with a memory, wherein the at least one processor is configured to execute instructions stored in the memory, to enable the terminal device to perform the following operations:

determining that the terminal device is in an idle mode for a time period longer than a predetermined duration;

initiating setup of a packet data unit (PDU) session on a second access network, wherein the PDU session is a PDU session that is set up on a first access network and accessible on the second access network;

determining that the terminal device enters a deregistration state of the first access network;

sending information about a second PDU session to a second core network element on the second access network, wherein the second PDU session is a PDU session that is set up by the terminal device on the first access network and accessible on the second access network and that is determined by the terminal device, and the third PDU session is determined by the second core network element based on the information about the second PDU session;

receiving information about a third PDU session from the second core network element, wherein the third PDU session is a PDU session that is set up by the terminal device on the first access network and accessible on the second access network and that is determined by the second core network element; and synchronizing inconsistent information about the second PDU session between the terminal device and the second core network element based on the information about the third PDU session.

14. The terminal device according to claim 13, wherein the operations further comprise:

determining the PDU session that is set up on the first access network and accessible on the second access network.

15. The terminal device according to claim 13, wherein the operations further comprise:

the determining the PDU session that is set up on the first access network and accessible on the second access network comprises:

determining, based on the information about the third PDU session, the PDU session that is set up by the terminal device on the first access network and accessible on the second access network.

16. The terminal device according to claim 13, wherein the operations further comprise:

determining an access type of a PDU session that is set up by the terminal device on the first access network and accessible on the second access network as access from the second access network.

17. The terminal device according to claim 13, wherein the operations further comprise:

setting a status of the terminal device to deregistered from the first access network.

* * * * *